(12) United States Patent
Zaidi et al.

(10) Patent No.: US 7,062,587 B2
(45) Date of Patent: Jun. 13, 2006

(54) UNIDIRECTIONAL BUS ARCHITECTURE FOR SOC APPLICATIONS

(75) Inventors: S. Jauher A. Zaidi, Cupertino, CA (US); Michael Ou, Newark, CA (US); Lyle E. Adams, San Jose, CA (US); Hussam I. Ramlaoui, San Jose, CA (US); Billy D. Mills, Windsor, CO (US); Robin Bhagat, Fremont, CA (US)

(73) Assignee: Palmchip Corporation, Santa Clara, CA (US)

( * ) Notice: Subject to any disclaimer, the term of this patent is extended or adjusted under 35 U.S.C. 154(b) by 0 days.

(21) Appl. No.: 10/628,163

(22) Filed: Jul. 28, 2003

(65) Prior Publication Data

US 2004/0022107 A1 Feb. 5, 2004

Related U.S. Application Data

(63) Continuation of application No. 09/565,282, filed on May 2, 2000, now Pat. No. 6,601,126.

(60) Provisional application No. 60/176,921, filed on Jan. 20, 2000.

(51) Int. Cl.
*G06F 13/00* (2006.01)

(52) U.S. Cl. ...................... 710/305; 710/100

(58) Field of Classification Search ............. 710/305, 710/100, 308, 27; 711/154
See application file for complete search history.

(56) References Cited

U.S. PATENT DOCUMENTS

| | | | | |
|---|---|---|---|---|
| 4,672,587 A | * | 6/1987 | Geiger et al. .......... | 365/189.01 |
| 4,849,979 A | | 7/1989 | Maccianti et al. | |
| 5,420,989 A | * | 5/1995 | Maher et al. ............ | 710/110 |
| 5,935,232 A | * | 8/1999 | Lambrecht et al. ...... | 710/315 |
| 6,145,069 A | * | 11/2000 | Dye ........................ | 711/170 |
| 6,226,723 B1 | | 5/2001 | Gustavson et al. | |
| 6,353,867 B1 | * | 3/2002 | Qureshi et al. ......... | 710/305 |

(Continued)

FOREIGN PATENT DOCUMENTS

GB 2377138 A * 12/2002

OTHER PUBLICATIONS

ARM Limited, AMBA Specification (Rev 2.0), ARM IHI 0011A, May 13, 1999.

(Continued)

*Primary Examiner*—Paul R. Myers
(74) *Attorney, Agent, or Firm*—Matthew J Booth & Associates, PLLC; Matthew J Booth

(57) ABSTRACT

The System-on-Chip apparatus and integration methodology disclosed includes a single semiconductor integrated circuit having one or more processor subsystems, one or more DMA-type peripherals, and a Memory Access Controller (MAC) on a first internal unidirectional bus. The first internal unidirectional bus controls transactions between the processor subsystem(s) and the DMA peripheral(s) using a Memory Access Controller (MAC) and unidirectional, positive-edge clocked address and transaction control signals. The first internal unidirectional bus can support burst operation, variable-speed pipelined memory transactions, and hidden arbitration. The SoC may include a second internal unidirectional bus that controls transactions between the processor subsystem(s) and non-DMA peripherals. The second internal unidirectional bus controls transactions between the processor subsystem(s) and the non-DMA peripheral(s) using unidirectional address and transaction control signals. Peripherals may be synchronous or asynchronous to their respective buses.

15 Claims, 28 Drawing Sheets

U.S. PATENT DOCUMENTS

| | | |
|---|---|---|
| 6,457,108 B1 | 9/2002 | Hsu et al. |
| 6,477,606 B1 | 11/2002 | Kawamura et al. |
| 6,484,280 B1 | 11/2002 | Moberly |
| 6,526,462 B1 | 2/2003 | Elabd |
| 6,530,047 B1 | 3/2003 | Edwards et al. |

OTHER PUBLICATIONS

OCP International Partnership, Open Core Protocol, Sep. 2001.

* cited by examiner

UNIDIRECTIONAL BUS ARCHITECTURE FOR SOC APPLICATIONS

CROSS REFERENCE TO RELATED APPLICATIONS

This application is a continuation of U.S. patent application Ser. No. 09/565,282, filed May 2, 2000 (May 2, 2000) now U.S Pat. No 6,601,126, which is incorporated by reference for all purposes into this specification.

Additionally, this application claims the benefits of the earlier filed U.S. Provisional App. Ser. No. 60/176,921 filed Jan. 20, 2000 (Jan, 20, 2000), which is incorporated by reference for all purposes into this specification.

BACKGROUND OF THE INVENTION

1. Field of the Invention

The present invention relates generally to flexible modular integrated circuit embodiments, and more specifically to a structured framework for constructing and interfacing variable mixtures of computer processors, memories, peripherals, and other functional modules on a single semiconductor integrated circuit.

2. Description of the Related Art

As systems-on-chip (SoC) become more complex, it will be increasingly difficult for a single company to provide its customers with all of the intellectual property (IP) cores and library macrocells they require. Companies have to evaluate whether human resources, capital and time are expendable on extraneous developments. A growing trend is to outsource the areas that fall outside of their core competencies.

Time-to-market is the dominant factor directing this make vs. buy decision. SoCs are reaching higher levels of integration, but their complexity is inversely proportional to the allowable time-to-market. "Buying" semiconductor IP will become essential for surviving in an environment that demands increased profits and decreased time-to-market. For companies to meet the technology challenges of integrating externally developed semiconductor IP into a single chip, within the given time window, they will have to partner with others, including, in some cases, their competitors.

Outsourcing and partnership will be the essential elements of a successful semiconductor business in the next century because those capabilities will help companies deliver what customers want. Companies using SoC technologies have recognized the need to license or buy IP from other companies. But just purchasing the IP is not enough. Integrating IP in a system-on-chip is complicated, especially when components from multiple sources are involved. IP integrators and providers need to actively work together to make sure that all of the pieces of the SoC fit seamlessly. One way to leverage the strength of a partnership is by offering an open architecture.

Successful semiconductor companies must be able to deliver to the customer an on-chip architecture, in which components can be dropped in and interconnected with little difficulty. Open means that it is supported by third-party companies, thereby producing a collaborative effort to reduce the design-integration struggles found in SoC development, including hardware and software codesign and coverification. That also results in reducing time-to-market. Customers will have choices in how they build their SoC devices, which IP components to integrate, and what software and operating system to implement. Outsourcing and partnership are keys to successfully offering customers what they want. Taking this a step further, providing and/or supporting an open architecture gives customers the flexibility they need.

The electronics industry has been driven by the need to increase performance, reduce costs and enhance features. Many of these needs have been met through the use of newer, faster and cheaper technologies. Newer technologies continue to allow for more functions and features to be placed on a single piece of silicon. Functions that previously were placed on separate chips can now be integrated in a system-on-chip with new functions added.

In any processor-driven embodiment, a number of peripheral devices are needed. These include timers, DMA engines, interrupt controllers and memory controllers. In many cost-sensitive applications, a shared memory structure is preferably used to reduce memory component costs. An architecture is needed which addresses the memory needs of all devices without severely degrading the performance of any single device.

The PCIbus, ISA, VMEbus, and most other buses were designed as system level buses to connect discrete devices on a printed circuit board (PCB) substrate. At the board level, a key issue is minimizing the number of bus signals because pin and signal count translate directly into package and PCB costs. A large number of device pins increases package footprint and reduces component density on the board. System level buses must support add-in cards and PCB backplanes where connector size and cost are also directly related to signal count. This is why traditional system level buses use shared tri-state signaling and, in the case of PCIbus, multiplexed address and data on the same signals. Timing problems can be investigated in the lab using prototype PCBs that can then be modified and re-spun in a few days.

In the on-chip world, signal routing consumes silicon area but does not affect the size or cost of packages, PCBs and connectors. The limited capabilities of today's logic synthesis tools directly impact embodiment time and performance and must be taken into account. Getting the lowest possible routing overhead is of little value if the system design time balloons way out of proportion and the market window is missed. Synthesis tools find it difficult to deal with shared tri-state signals with several drivers and receivers connected to the same trace. Static timing analysis is awkward, and often the only way to verify timing is to use a circuit level simulator such as Spice. All of this takes time and effort without adding real value in terms of device functionality or features. Bus loading also limits theoretical performance and the verification problems associated with bus loading can lead to a conservative embodiment whose performance falls short of the inherent technology capabilities.

The on-chip world has a significantly different set of embodiment constraints and tradeoffs compared with the board-level environment. A bus designed for use on PCBs will not provide the most efficient on-chip solution. When we started the embodiment of our GreenLite hard disk controller we quickly realized that we needed to create a completely new bus architecture optimized for systems-on-silicon. The key issues were performance, embodiment time reduction, ease of use, power consumption and silicon efficiency. The following sections describe embodiments of the present invention and show how we satisfied those requirements.

SUMMARY OF THE INVENTION

It is therefore an object of the present invention to provide a system-on-chip interconnection structure and method for efficient integration of a variety of functional circuits. It is a further object of the present invention to provide an on-chip interconnect architecture that standardizes how systems-on-chip are fabricated on silicon semiconductor integrated circuit chips. The present invention is a System-on-Chip apparatus and integration methodology wherein a single semiconductor integrated circuit includes one or more processor subsystems, one or more DMA-type peripherals, and a Memory Access Controller on a first internal unidirectional bus. The first internal unidirectional bus controls transactions between the processor subsystem(s) and the DMA peripheral(s) using a Memory Access Controller and unidirectional address and transaction control signals that are launched and captured on the rising edges of the bus clock signal. The first internal unidirectional bus supports pipelined memory transactions, wherein a memory access may occur before data associated with a prior memory access has been transferred. In some embodiments, the first internal unidirectional bus includes a bus arbiter that grants access to the first internal unidirectional bus and arbitrates memory accesses for transactions on the first internal unidirectional bus. In some embodiments that include a bus arbiter, arbitrations are "hidden," meaning that the memory access arbitration for a selected transaction may overlap a data transfer associated with a prior transaction, or may occur in the same clock cycle in which access is granted and data transfer begins for the selected transaction.

In some embodiments of the present invention, the first internal unidirectional bus supports reading and writing data in bursts. In some embodiments, a variable number of clock cycles may elapse between any two pipelined memory transactions.

Some embodiments of the present invention may include a second internal unidirectional bus that couples the processor subsystem(s) via an interface controller to one or more non-DMA peripherals. The second internal unidirectional bus controls transactions between the processor subsystem(s) and the non-DMA peripheral(s) using unidirectional address and transaction control signals.

In some embodiments, the DMA peripherals may operate asynchronously with the first internal unidirectional bus and/or the non-DMA peripherals may operate asynchronously with the second internal unidirectional bus, meaning that the peripherals use a clock signal in a different time domain or at a different frequency from the clock signal used by the bus(es) on which the peripheral communicates.

In sum, a system-on-chip interconnection structure and method embodiment of the present invention uses unidirectional buses only, central shared memory controllers, separate interconnects for high-speed and low-speed peripherals, zero wait-state register accesses, application-specific memory map and peripherals, application-specific test methodology, allowances for cache controllers, and fits well with standard ASIC flow and tools. The present invention enables electronics applications to be developed quickly and to be portable between silicon foundries. Additionally, the present invention provides systems that can run at higher clock speeds. These and other objects and advantages of the present invention will no doubt become obvious to those of ordinary skill in the art after having read the following detailed description of the preferred embodiments, which are illustrated in the drawings.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a system-on-chip interconnection structure and method that enables the efficient on-chip integration of a variety of functional circuits and peripherals. The present invention provides an on-chip interconnect architecture that standardizes how systems-on-chip are fabricated on silicon semiconductor integrated circuit chips. This disclosure describes numerous specific details that include specific structures, circuits, and logic functions in order to provide a thorough understanding of the present invention. One skilled in the art will appreciate that one may practice the present invention without these specific details.

Figure 1:
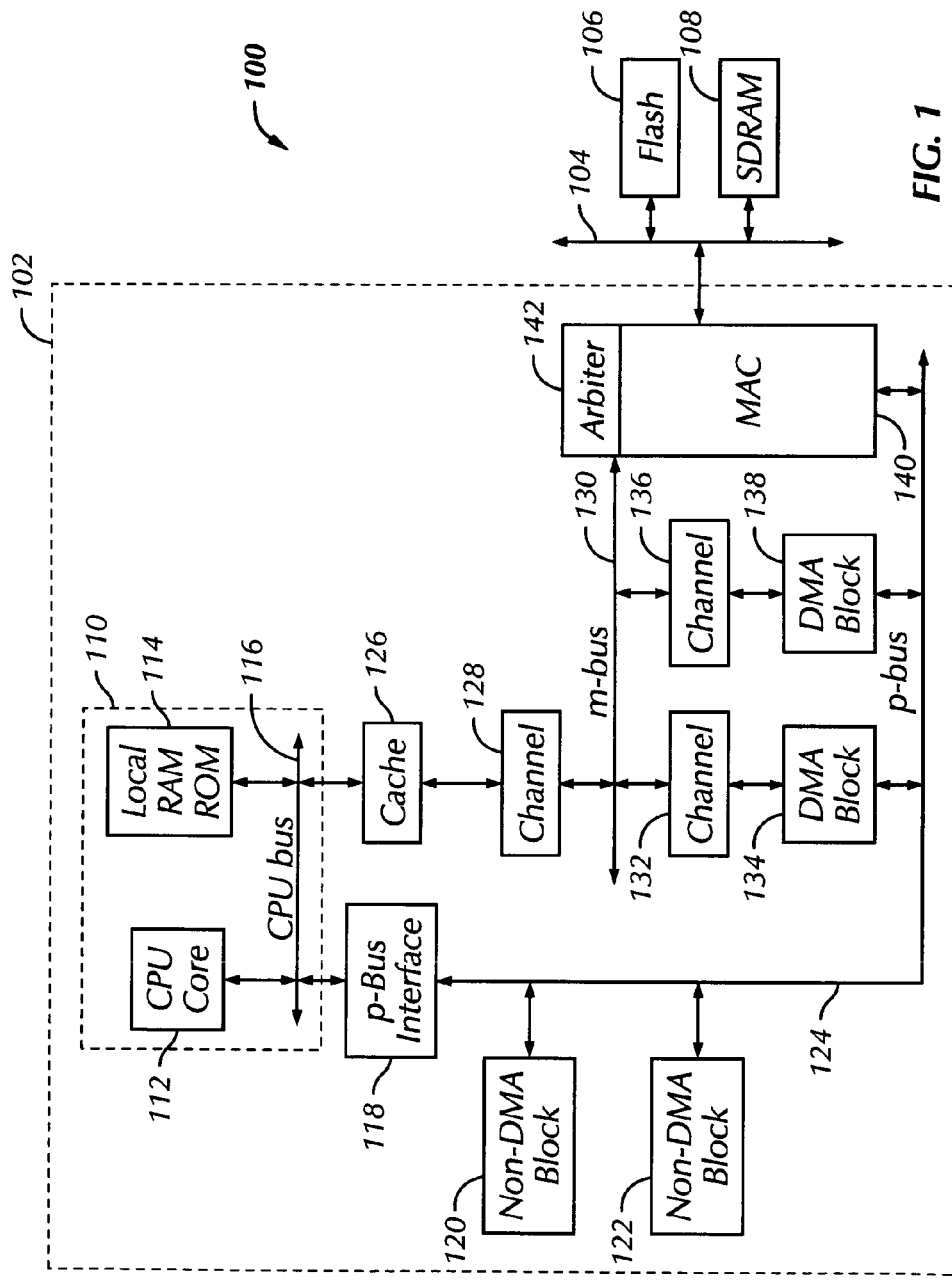
FIG. 1 is a functional block diagram of an on-chip interconnect architecture embodiment of the present invention for system-on-chip integration.

FIG. 1 illustrates an on-chip interconnect architecture embodiment of the present invention for system-on-chip integration, and is referred to by the general reference numeral 100. The system-on-chip interconnect architecture 100 comprises a single semiconductor chip 102 that may be externally interfaced to a shared memory bus 104 with memory such as a flash memory 106 and SDRAM 108. A CPU subsystem 110 includes a CPU core 112 and a local RAM-ROM memory 114. A CPU bus 116 interfaces these to a p-bus interface controller 118 which hosts several peripheral blocks, Including DMA blocks 134 and 138 and non-DMA blocks 120 and 122 connected to a peripheral bus (p-bus) 124. A cache 126 and channel controller 128 interface the CPU bus 116 to a memory bus (m-bus) 130. Another m-bus channel controller 132 interfaces to DMA-block 134. Other such DMA interfaces between the m-bus 130 and p-bus 124 are represented by a channel controller 136 and DMA-block 138. A MAC 140 connects the shared memory bus 104 to the internal m-bus 130 and p-bus 124 with the aid of a bus arbiter 142.

The system-on-chip interconnect architecture 100 enables electronics applications to be developed quickly and to be portable between silicon foundries. Embodiments of architecture 100 must be easily synthesizable, centered around shared memory, flexible, modular, not sacrifice performance over alternative approaches, and must not add to embodiment cost. Therefore, embodiments of architecture 100 are constructed, in general, with unidirectional buses only, central shared memory controllers, separate interconnects for high-speed and low-speed peripherals, zero wait-state register accesses, application-specific memory map and peripherals, application-specific test methodology, allowances for cache controllers, and good fits with standard ASIC flow and tools.

The system-on-chip interconnect architecture 100 separates I/O control, data DMA and CPU onto separate buses to avoid bottlenecks. Architecture 100 includes two unidirectional buses 124 and 130 at bus speeds that are scalable to technology and embodiment requirements and that support various width peripherals. In general, architecture 100 separates peripheral input/output (I/O) and direct memory access (DMA) interconnects. As described further herein, unidirectional buses 124 and 130 have some or all of the following characteristics: simple protocols for reduced gate counts, positive-edge clocking for address and transaction control signals, no tri-state signals or bus holders, low capacitive loading for high performance operation, single clock cycle data transfers, hidden arbitration for DMA bus masters so no additional clock cycles are needed for the arbitration, DMA channels with buffers (FIFOs) for addressing memory, peripherals that do not require FIFOs to interface to a DMA channel, and a channel structure that reduces latency while enhancing reusability and portability.

The p-bus 124 provides for low-speed accesses to peripherals, while the m-bus 130 allows for high-speed accesses to shared memory from the CPU core 112 and peripherals. The p-bus 124 is the communications interface between the CPU and its peripherals, and is not used to access memory. The p-bus 124 has a master-slave interface and all data, addressing, and transaction control signals on the pbus 124 are point-to-point unidirectional signals. The CPU core 112 connected through an interface controller 118 as its single master. Its signal timing is synchronous with the CPU core 112. The MAC 140, arbiter 142 and channels (e.g., 132, 136) may also be tied to the p-bus 124 for configuration, control and status.

The m-bus 130 is the communications interface between the MAC 140 and the DMA channels (e.g., 132, 136). The m-bus 130 is preferably an arbitrated initiator-target interface with only one target, the MAC 140. Each initiator, or master, arbitrates for command of the MAC 140. Once a transfer is granted, the MAC 140 becomes the bus master and thereafter controls all the data flow. The m-bus 130 is synchronous to the MAC 140 and can facilitate peer-to-peer communications, but it is optimally used for peripheral-to-memory and memory-to-peripheral communications. Data, addressing, and transaction control signals on the mbus 130 are point-to-point unidirectional signals.

The CPU core 112 may be provided by a silicon foundry as a hard core (e.g., ARM7, APM9, MIPS, PowerPC, etc.) or by a core vendor as a soft core (e.g. ARM7TDMI-S, Lexra or ARC). The interface specifications for such must be provided. The preferred clock rate applied to the CPU core 112 depends on the p-bus 124 clock rate. It may be a divide-by-two of the p-bus 124 clock signal when the processor cannot be run at full system speed, or in order to guarantee a clock with a fifty percent duty cycle to the CPU. The CPU core clock can also be run at the same speed as the system to make everything fully synchronous and for performance.

All internal memory that is used exclusively by the processor is preferably connected directly to the CPU core 112 on its native buses. Address latching may be required. If no wait states are needed, then interface logic is minimal. The interface controller 118 generates a clock signal for the CPU and provides timing translation, blocks 120, 122, 134 and 138 address decode, and wait generation. The channel controllers 132 and 136 interface between any DMA peripherals and the m-bus 130. A peripheral block 134 or 138 interfaces to a channel only if it accesses shared memory. If a peripheral block 134 or 138 is asynchronous to the MAC 140, a buffer (FIFO) is implemented where the block's 134 or 138 side of the buffer is synchronous to the block's 134 or 138 clock signal. The MAC 140 side of the buffer is made synchronous to the MAC 140. The MAC 140 is a target of the m-bus 130, and controls accesses to shared memory. Such includes all timing and protocol controls. Its interface to the arbiter 142 may be direct or through the m-bus 130, or with connections to both.

The arbiter 142 is generally application specific. It takes requests from each of the channels and responds with a grant when an access can be accommodated. It may be directly connected the MAC 140. In general, each of the blocks 120, 122, 134 and 138 is preferably attached to the p-bus 124. Blocks that are generally needed in processor-based systems but which are not part of the CPU core 112 are attached to the p-bus 124. Examples of such blocks are timers, interrupt controllers and UARTs. If a peripheral block 134 and 138 performs DMA accesses to shared memory, it includes a p-bus 124 interface and a channel controller 132 and 136 to the m-bus 130.

An embodiment hardware development kit (PALM-CF2000) marketed by Palmchip Corporation (San Jose, Calif.) includes the peripheral components required for an ARM7TDMI system-on-chip embodiment. It includes a p-bus controller, m-bus bridge, DMA channel interfaces, system timer, watchdog timer, interrupt controller and memory controller. Such kit also includes a UART that may be used for software debug and system monitoring. New peripherals can be added and pre-existing functions ported to the p-bus and m-bus. Variations on the interface controller 118 and cache 126 can be made to support other CPU cores. For more information, see Palmchip's products web page at http://www.palmchip.com. Palmchip's PalmBeach development kit includes a development board, Gatefield FPGA toolkit, ARM software development toolkit and ARM7TDMI with JTAG embedded ICE for ARM. The HDK peripherals are preloaded into a Gatefield FPGA leaving room for 100K gates of custom logic and space on the board for analog chips and connectors. Memory types supported are EDO DRAM, SDRAM, flash memory and EPROM. All ARM7, memory, embodiment interface, GPIO and UART port signals are visible.

Embodiments of the present invention preferably support ATPG and synchronous scan insertion done after a first netlist's simulation has been proved with test vectors. Scan insertion is then done and functional test vectors are rerun on the embodiment.

Figure 2:
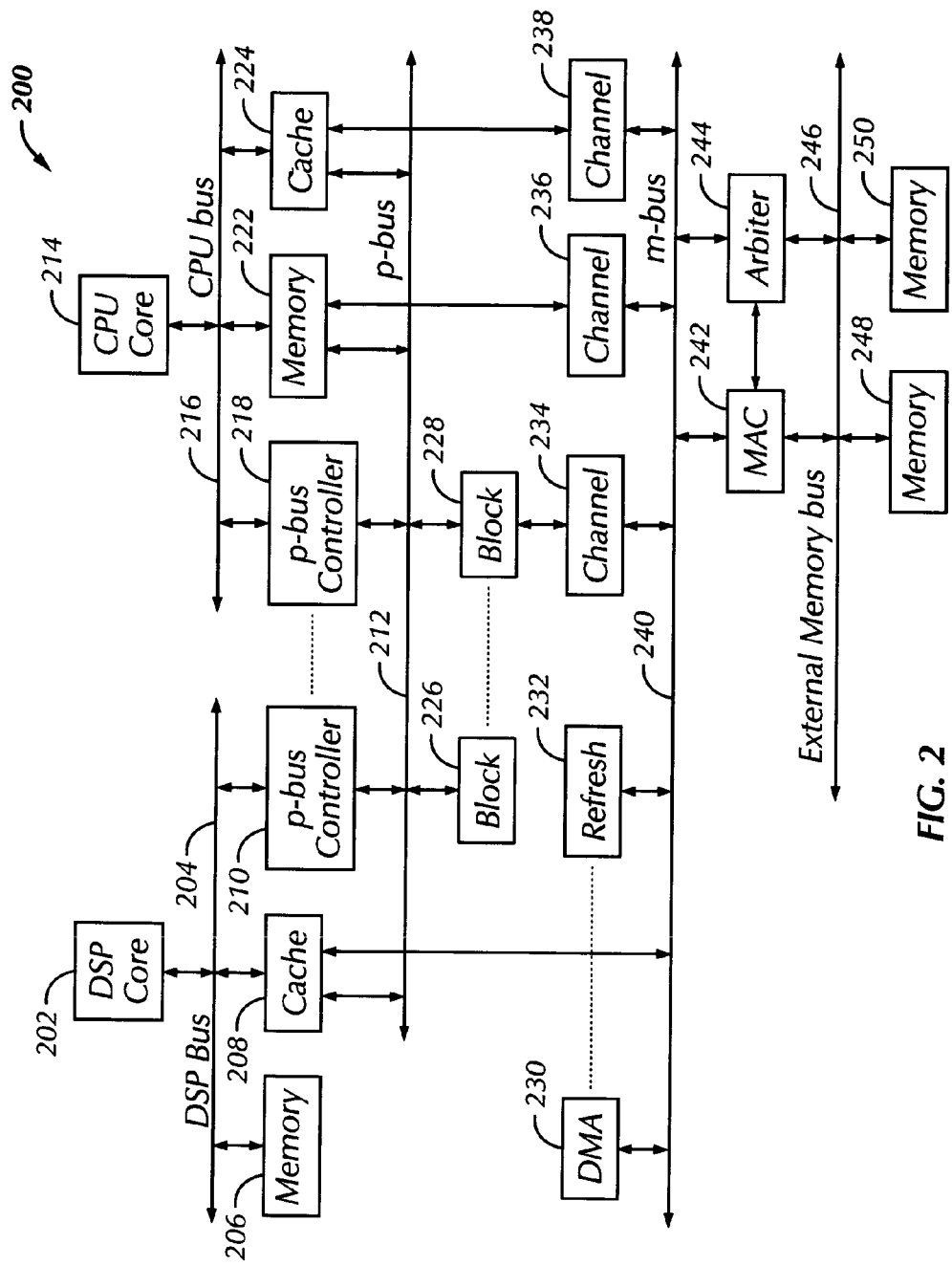
FIG. 2 is a functional block diagram of a multi-processor hierarchy embodiment of the present invention.

FIG. 2 illustrates a more complex example with more than one processor. A multi-processor system 200 includes, for example, a digital signal processor (DSP) core 202 connected to a private DSP-bus 204. A memory 206, a cache 208, and a p-bus controller 210 all interface to the DSP-bus 204. A p-bus 212 is common to other processors such as a CPU core 214. A private CPU-bus 216 is connected to a p-bus controller 218, a memory 222, and a cache 224. The p-bus is interfaced to several blocks represented by a pair of blocks 226 and 228. A DMA controller 230 is associated with a refresh controller 232 and several channel controllers 234, 236, and 238, on an m-bus 240. A memory access controller 242 is controlled by a bus arbiter 244 and will allow connections with an external memory bus 246. External memory units are represented by a pair of memories 248 and 250.

One cache 224 is illustrated with a channel interface 238 and the/other cache 208 interfaces directly with m-bus 240. One processor memory DMA 222 is shown with a direct fill DMA channel 236 and the other memory 206 is not. Block 228 is shown with channel interface 234 to external shared memory 248 and 250, and block 226 has no such interface.

The p-buses 124 (FIG. 1) and 212 communicate between their CPUs and other peripherals, and are synchronous to the respective CPU. P-buses preferably support zero-wait-state accesses, and have data and address widths that are application-specific. The p-buses 124 (FIG. 1) and 212 include a master-slave interface that can support a single CPU master or multiple CPU masters. Its timings are synchronous with the CPU core, operating at a preferred clock signal rate that is equal to or twice the CPU clock signal rate.

From a physical perspective, p-bus signals (excluding the bus clock, pb_clk) fall into the following two general categories: signals that are broadcast from the interface controller to all blocks, and "blk" signals that are sent point-to-point between the controller and a specific block.

From a functional perspective, again excluding the p-bus clock, all p_bus signals are considered to be one of three types of signals: address signals that transfer address information (pb_addr); transaction control signals that transfer information relating to a specific transaction (pb_re, pb_rs, pb_we, pb_ws, pb_blk_sel, and pb_wait); and data signals (pb_wdata and pb_rdata). See Tables I and II. The prefix "pb" is specific to the p-bus embodiments of the present invention.

TABLE I

P-bus Signal Summary

| Signal | Direction | Required | Timing | Description |
| --- | --- | --- | --- | --- |
| pb_clk | n/a | yes | n/a | p-bus clock, equal to or twice interface clock |
| pb_addr | cntlr-to-blks | yes | early, first 30% of clock cycle | Address to write or read |
| pb_wdata | cntlr-to-blks | yes, for write-only and read/write block | early, first 30% of clock cycle | Write data from CPU |
| pb_re | cntlr-to-blks | yes, at least one for read-only, and read/write block | early, first 30% of clock cycle | Synchronous read enable for data in flip-flops |
| pb_rs | cntlr-to-blks | yes, at least one for read-only, and read/write block | mid, first 60% of clock cycle | Asynchronous read strobe for data in flip-flops |
| pb_we | cntlr-to-blks | yes, at least one for read-only, and read/write block | early, first 30% of clock cycle | Synchronous write enable for data in flip-flops |
| pb_ws | cntlr-to-blks | yes, at least one for read-only, and read/write block | mid, first 60% of clock cycle | Write strobe for asynchronous data in flip-flops |
| pb_blk_sel | cntlr-to-blks | yes | early, first 30% of clock cycle | Read or write block select |
| pb_blk_rdata | blk_to-cntlr | yes, at least one for read-only, and read/write block | late, first 70% of clock cycle | Read data to CPU |
| pb_blk_wait | blk_to-cntlr | no | early, first 30% of clock cycle | wait |

TABLE II

P-bus Signal Descriptions

| Signal | Description |
| --- | --- |
| pb_clk p-bus clock signal | All signals are synchronous to the pb_clk. This is a clock signal that is used by the p-bus controller. The pb_clk signal can be either the same frequency or twice the frequency of the CPU clock signal, depending on the target application and chip vendor process. High performance embodiments requiring a system clock signal which is running faster (up to two times) than the maximum speed of the processor can use the pb_clk running at twice the CPU clock signal frequency. In other systems where the processor can run on a same frequency as the system, pb_clk can match the CPU clock signal frequency. The pb_clk signal may be generated and |

TABLE II-continued

P-bus Signal Descriptions

| Signal | Description |
| --- | --- |
| | distributed by the p-bus controller, or may be generated by a clock signal control module and distributed to the p-bus controller and other modules. |
| pb_addr p-bus address | The p-bus 124 and 212 address is the address of a memory-mapped memory location (memory, register, FIFO, etc.) that a CPU wishes to access. It is shared for reads and writes, and is broadcast to all blocks. It becomes valid on the rising edge of pb_clk when a pb_blk_sel is "1". |
| pb_wdata p-bus write data | The p-bus write data is the data to be written to a memory-mapped memory location (memory, register, FIFO, etc.) by the CPU. It is preferably used only for writes and is broadcast to all blocks. It becomes valid on the rising edge of pb_clk when a pb_blk_sel and the corresponding pb_ws or pb_we is "1". |
| pb_re p-bus read enable | The p-bus read enable is used to validate a read access from a memory-mapped memory location (memory, register, FIFO, etc.) by the CPU. Each block has either a pb_re or a pb_rs or both. pb_re is ignored for writes. It is launched on the rising edge of pb_clk and is valid until the next rising edge of pb_clk. A pb_blk_sel is asserted for all cycles where pb_re is "1", and validates the read enable. |
| pb_rs p-bus read strobe | The p-bus read strobe is used to validate a read access from a memory-mapped memory location (memory, register, FIFO, etc.) by the CPU. Each block has either a pb_re or a pb_rs, or both. pb_rs is ignored for writes. It is launched on the falling edge of pb_clk and is valid until the next rising edge of pb_clk. A pb_blk_sel is asserted for all cycles where pb_rs is "1", and validates the read strobe. The signals pb_re or pb_rs may be used to trigger any operation that is initiated on a p-bus read, e.g., pb_re may be used to update FIFO pointers on reads. |
| pb_we p-bus write enable | The p-bus write enable is used to validate a write access to a memory-mapped memory location (memory, register, FIFO, etc.) by the CPU. Each block has either a pb_we or a pb_ws, or both. pb_we is ignored for reads. It is launched on the rising edge of pb_clk and is valid until the next rising edge of pb_clk. A pb_blk_sel is asserted for all cycles where pb_we is "1", and validates the write enable. |
| pb_ws p-bus write strobe | The p-bus write strobe is used to validate a write access to a memory-mapped memory location (memory, register, FIFO, etc.) by the CPU. Each block has either a pb_we or a pb_ws, or both. pb_we is ignored for reads. It is launched on the falling edge of pb_clk and is valid until the next rising edge of pb_clk. A pb_blk_sel is asserted for all cycles where pb_ws is "1", and validates the write strobe. |
| pb_blk_sel p-bus block select | The p-bus block select indicates that an access to the specific block is valid. Each block has a select. The selects are generally mutually exclusive (only one asserted at a time), but are not necessarily so. For example, all block-selects will be simultaneously asserted for a broadcast write. pb_blk_sel is valid on the rising edge of pb_clk. |
| pb_blk_rdata p-bus block read data | The p-bus block read data is the data read from a memory-mapped memory location (memory, register, FIFO, etc.) by the CPU. Each block with memory-mapped locations readable by the CPU has a pb_blk_rdata. It is preferably used only for reads and is ignored for writes. It is valid on the rising edge of pb_clk when a pb_blk_sel is "1". |
| pb_blk_wait p-bus block wait | The p-bus block wait is used to generate the wait signal to the CPU. The CPU wait signal is asserted by the p-bus controller when it decodes an address range which requires a wait or when the block indicates that a wait will be necessary. The CPU wait signal remains asserted until the pb_blk_wait is deasserted indicating that an access is complete. If the access is a write operation, it must be safe for the pb_wdata and associated control signals to be negated on a next rising edge of pb_clk. If the access is a read operation, the data must remain valid on the pb_blk_rdata |
| | lines until the next rising edge of pb_clk. Pb_blk_sel, pb_addr and pb_wdata must remain stable from the beginning of a wait cycle until pb_blk_wait is negated. However, pb_we, pb_ws, pb_re and pb_rs are asserted for only one half or one clock signal cycle regardless of wait. This preferable arrangement simplifies FIFO type logic, eliminating the need for peripherals to latch address and data, or to perform an edge detect of the read/write strobes or enables. |

The pb_we and pb_ws signals are used to trigger any operation that is initiated on a p-bus write, e.g., pb_we may be used to update FIFO pointers on writes. The pb_we signal is preferably a full clock cycle wide, and pb_ws is only a half clock cycle wide and occurs in the second half of the period. This arrangement allows latch-based embodiments to be easily integrated. The pb_ws signal is only asserted during the second half of the clock signal cycle to allow time for address decode before its qualification with the strobe.

When writing to synchronous registers such as counters that are not static, a full-clock cycle-wide signal (pb_we) is preferably used to enable the register write data. This allows the maximum time for signal propagation to the flip-flop inputs. If a register is implemented with a latch or if a register is implemented with the write strobe as the clock signal input to a flip-flop, the half-clock signal (pb_ws) is preferably used to allow time for the address decode to stabilize before being enabled by the strobe.

When using pb_ws asynchronously to clock a flip-flop or to enable a latch, the address decode logic must not change state while pb_ws is asserted. This can be done by ensuring that an address decode is complete within one-half pb_clk cycle and that a qualification of the address with pb_ws is the last operation done before the result is used as the latch enable or the flip-flop clock signal.

If all reads are from static registers, the pb_re and pb_rs signals may be omitted by using the pb_blk_sel and pb_addr signals alone to generate pb_blk_rdata. If however, the read triggers any operation such as a state machine or FIFO pointer update, either pb_re or pb_rs must be used.

FIGS. 3–8 represent the signal waveforms and timing for a "normally not ready" block which negates pb_blk_wait when not addressed. Signal pb_blk_wait is asserted immediately when being addressed if the access will take more than one, cycle. A "normally not ready" block asserts pb_blk_wait when not addressed. It negates pb_blk_wait when it is addressed and the access can be completed in one cycle. Otherwise pb_blk_wait stays asserted. The p-bus controller must ignore pb_blk_wait except when the block "blk" is being accessed.

Figure 3:
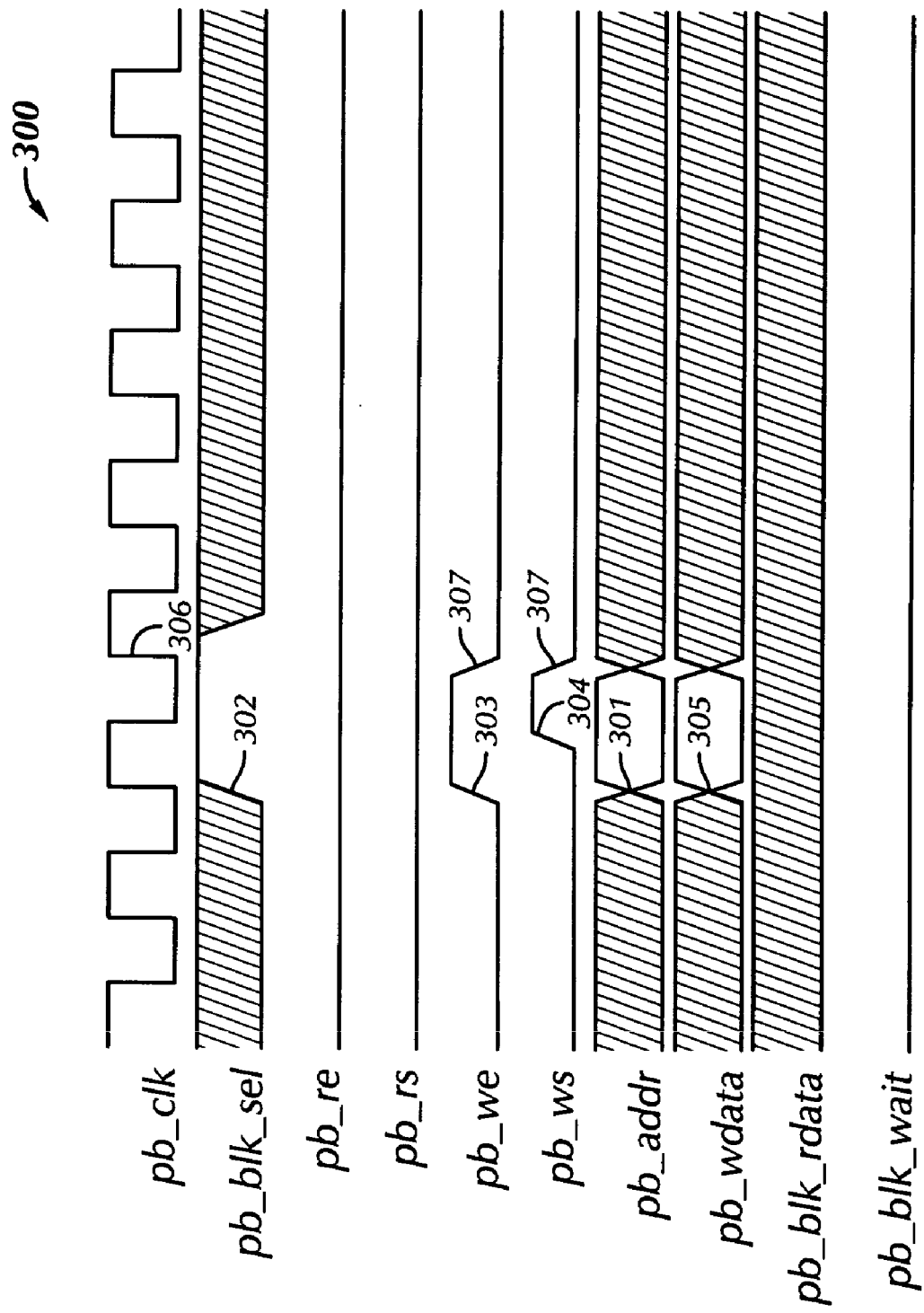
FIG. 3 is a timing diagram of a p-bus write protocol embodiment of the present invention.

FIG. 3 represents the signal waveforms and timing for the p-bus write protocol 300. The signal pb_addr becomes valid 301 on a rising edge of pb_clk. A pb_blk_sel signal is also generated 302 along with pb_addr from the same address inputs. Signal pb_we is asserted 303 on a rising edge of pb_clk. Signal pb_ws is asserted 304 on a falling edge of pb_clk. Signal pb_wdata becomes valid 305 on a rising edge of pb_clk. Signals pb_addr, pb_blk_sel, pb_wdata and pb_rdata may be invalid on a next rising edge of pb_clk 306 when pb_we, pb_ws, pb_re and pb_rs are not asserted and when wait is not active. Signals pb_we and pb_ws are negated 307 on a next rising edge of pb_clk.

Figure 4:
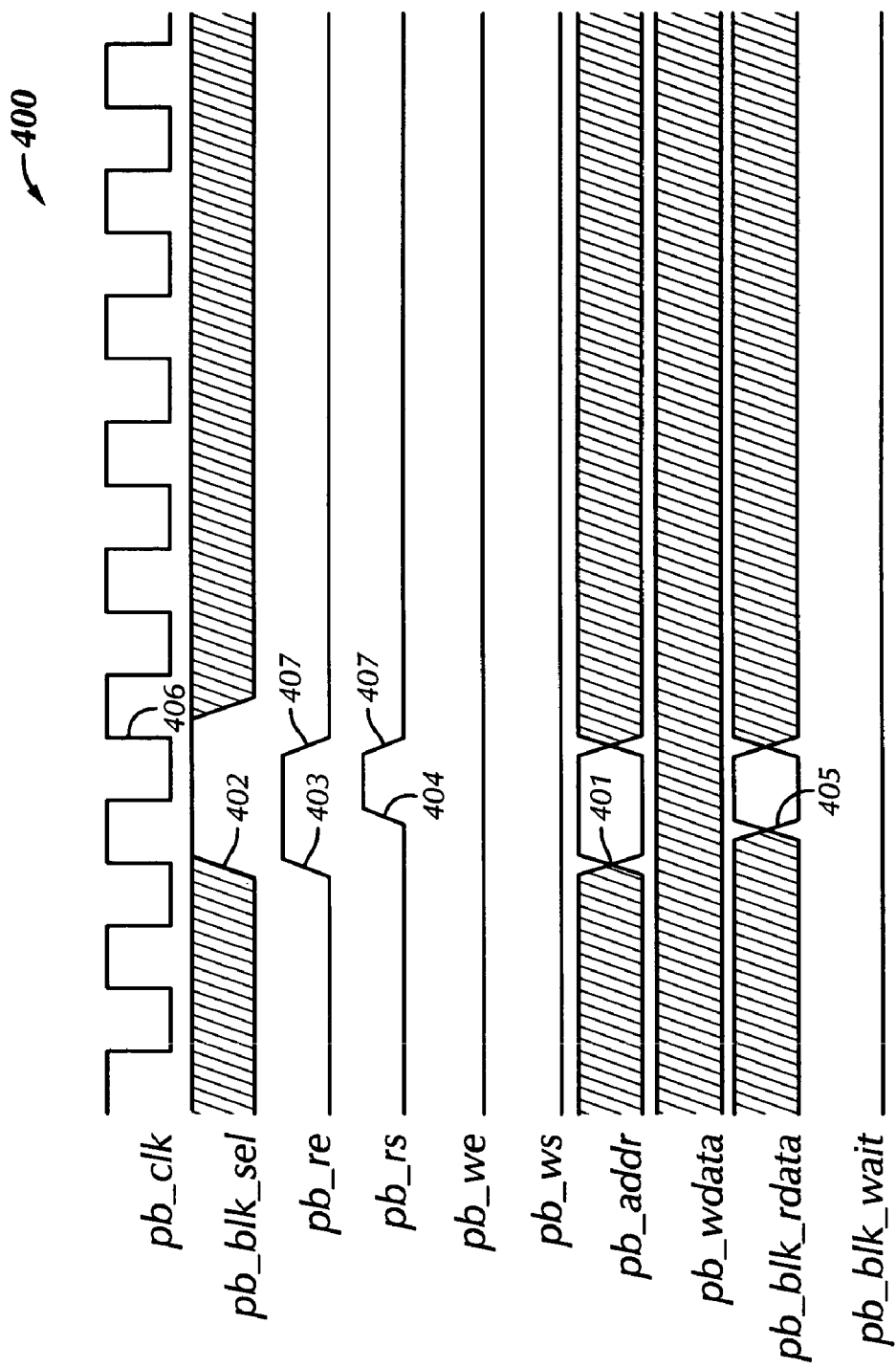
FIG. 4 is a timing diagram of a p-bus read protocol embodiment of the present invention.

FIG. 4 represents the signal waveforms and timing for the p-bus read protocol 400. Signal pb_addr becomes valid 401 on a rising edge of pb_clk. A pb_blk_sel signal is also generated 402 along with pb_addr from the same address inputs. Signal pb_re is asserted 403 on a rising edge of pb_clk. Signal pb_rs is asserted 404 on a falling edge of pb_clk. The pb_blk_rdata is valid 405 before the next rising edge of pb_clk 406, and is held for one flip-flop/latch hold time after the clock signal edge. Signals pb_addr, pb_blk_sel, pb_wdata and pb_rdata may be invalid on a next rising edge of pb_clk when pb_we, pb_ws, pb_re and pb_rs are not asserted and when wait is not active. Signals pb_re and pb_rs are negated 407 on a next rising edge of pb_clk.

Figure 5:
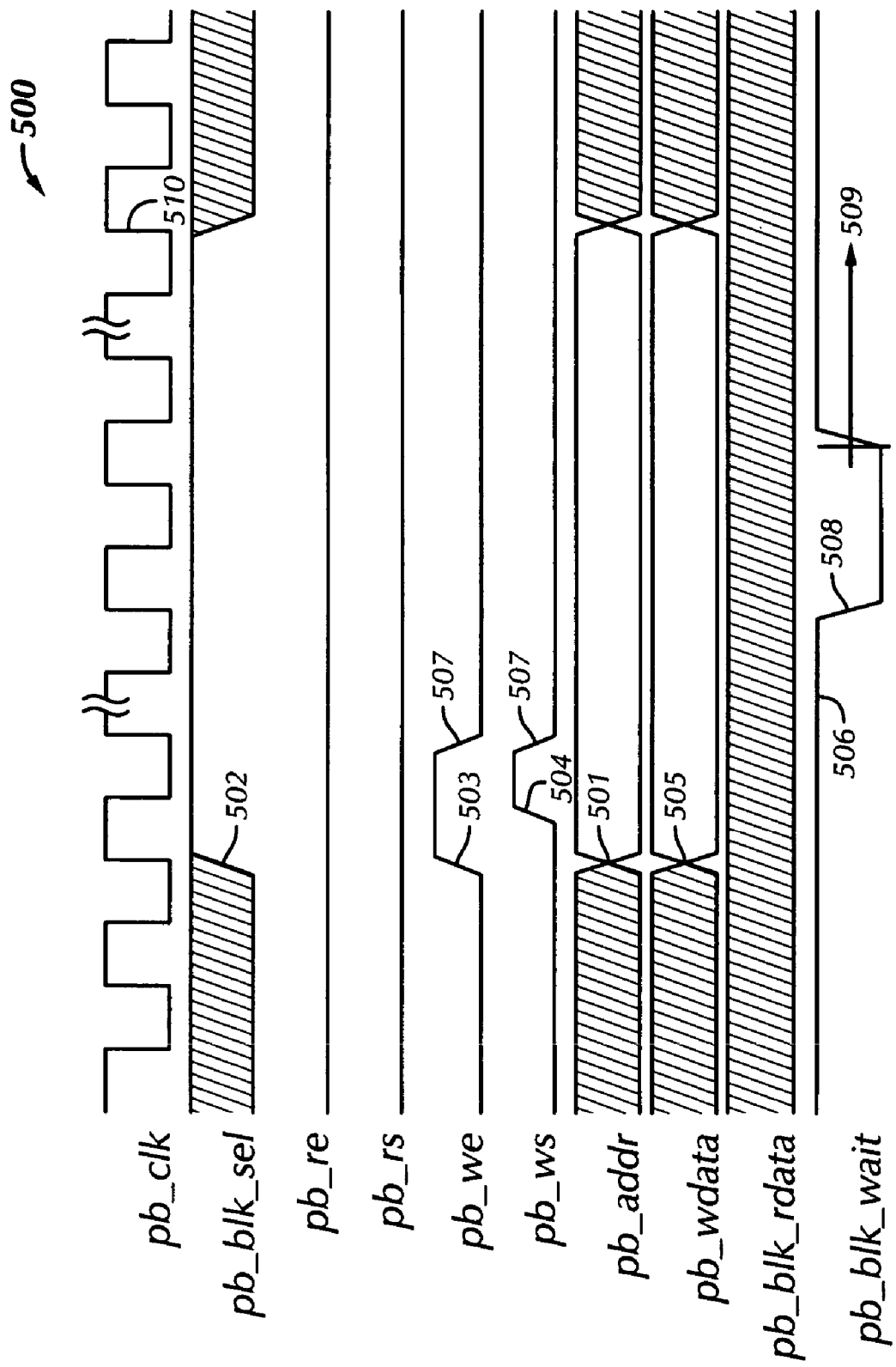
FIG. 5 is a timing diagram of a p-bus write, with asynchronous wait, protocol embodiment of the present invention.

FIG. 5 represents the signal waveforms and timing for the p-bus write protocol with asynchronous waits 500. Signal pb_addr becomes valid 501 on a rising edge of pb_clk. A pb_blk_sel signal 502 is also generated along with pb_addr from the same address inputs. Signal pb_we is asserted 503 on a rising edge of pb_clk. The pb_ws signal is asserted 504 on a falling edge of pb_clk. The pb_wdata becomes valid 505 on a rising edge of pb_clk. If the block requires wait states, pb_blk_wait remains asserted 506 on a next rising edge of pb_clk. Single pb_blk_wait may be held normally true if a wait will always be required. Signal pb_we and pb_ws will be negated 507 on a next rising edge of pb_clk. Signal pb_blk_wait is negated 508 when the write is complete (normally not ready). The trailing edge of pb_blk_wait is synchronized 509. Signals pb_addr, pb_blk_sel, pb_wdata and pb_rdata may be invalid on a next rising edge of pb_clk 510 when pb_we, pb_ws, pb_re and pb_rs are not asserted and when wait is not active.

Figure 6:
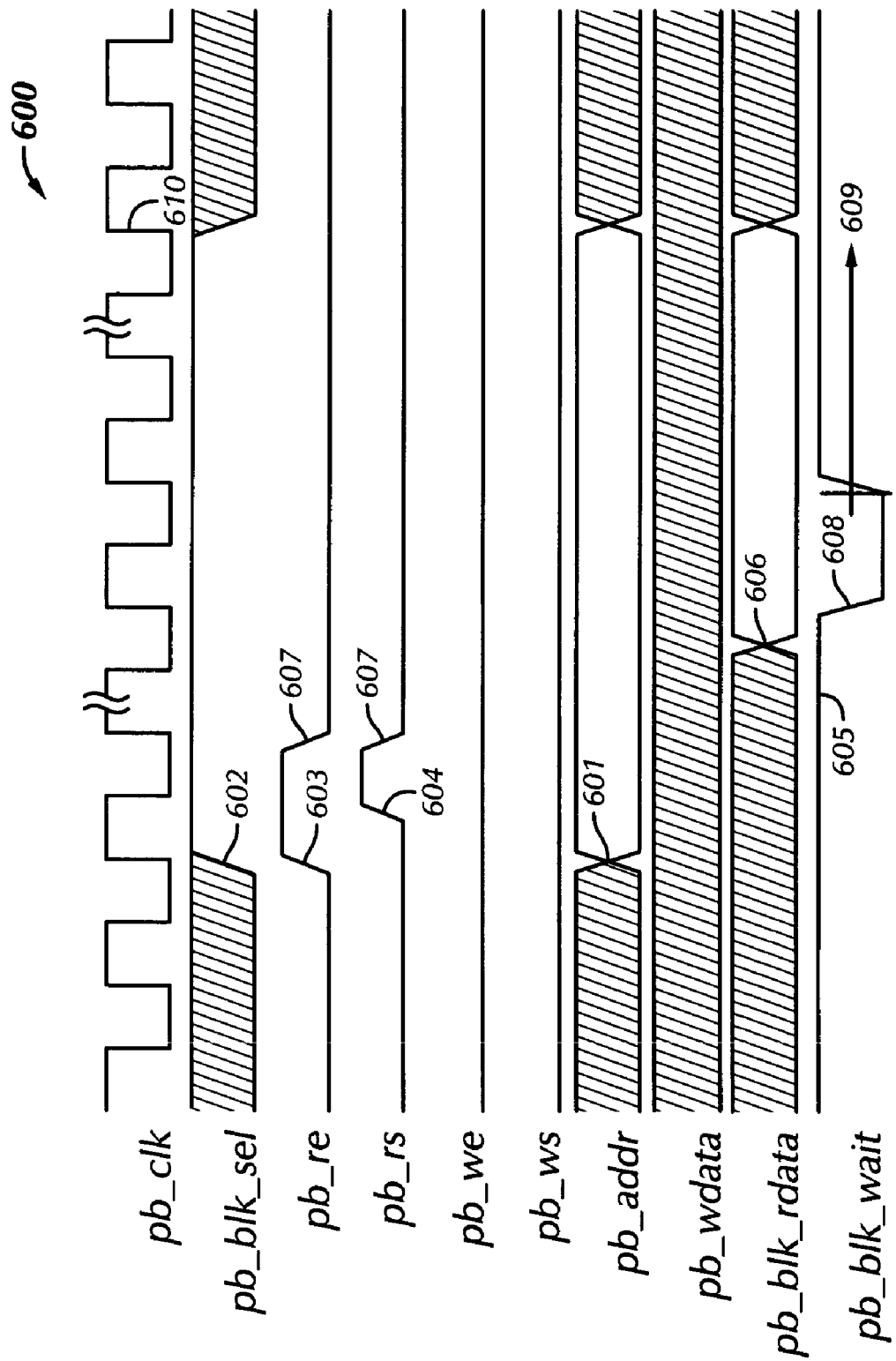
FIG. 6 is a timing diagram of a p-bus read, with asynchronous wait, protocol embodiment of the present invention.

FIG. 6 represents the signal waveforms and timing for the p-bus read protocol with asynchronous wait 600. This protocol illustrates a "normally not ready" system. The p-bus controller will ignore pb_blk_wait except when the block, "blk", is being accessed. Signal pb_addr becomes valid 601 on a rising edge of pb_clk. A pb_blk_sel signal is also generated 602 along with pb_addr from the same address inputs. Signal pb_re is asserted 603 on a rising edge of pb_clk. Signal pb_rs is asserted 604 on a falling edge of pb_clk. If the block requires wait states, pb_blk_wait remains asserted 605 on a next rising edge of pb_clk. Signal pb_blk_wait may be "normally true" if a wait will always be required. Signal pb_rdata is valid 606 before the negation of pb_blk_wait. Signal pb_re and pb_rs will be negated 607 on a next rising edge of pb_clk. Signal pb_blk_wait is negated 608 when the read data is ready. The trailing edge of pb_blk_wait 609 is synchronized. Signals pb_addr, pb_blk_sel, pb_wdata and pb_rdata may be invalid on a next rising edge of pb_clk 610 when pb_we, pb_ws, pb_re and pb_rs are not asserted and when wait is not active.

Figure 7:
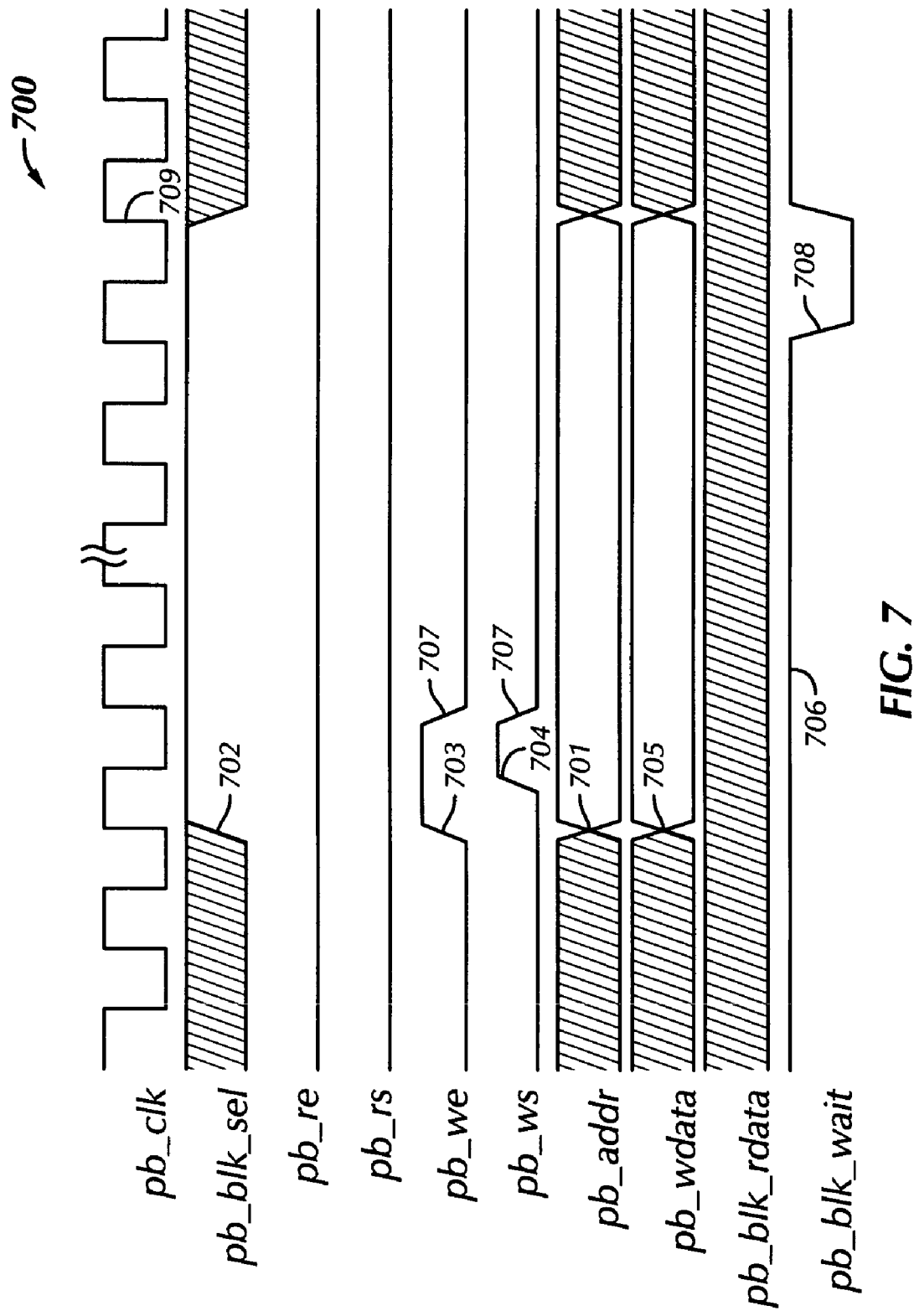
FIG. 7 is a timing diagram of a p-bus write, with synchronous wait, protocol embodiment of the present invention.

FIG. 7 represents the signal waveforms and timing for the p-bus write protocol with synchronous wait 700. This protocol illustrates a "normally not ready" system. The p-bus controller will ignore pb_blk_wait except when the block, "blk", is being accessed. Signal pb_addr becomes valid 701 on a rising edge of pb_clk. A pb_blk_sel signal is also generated 702 along with pb_addr from the same address inputs. Signal pb_we is asserted 703 on a rising edge of pb_clk. Signal pb_ws is asserted 704 on a falling edge of pb_clk. Signal pb_wdata becomes valid 705 on a rising edge of pb_clk. If the block requires wait states, then pb_blk_wait remains asserted 706 on a next rising edge of pb_clk. Signal pb_blk_wait may be "normally true" if a wait will always be required. Signals pb_we and pb_rs will be negated 707 on a next rising edge of pb_clk. Signal pb_blk_wait is negated 708 when the write is complete and remains negated until the next rising edge of pb_clk 709. Signals pb_addr, pb_blk_sel, pb_wdata and pb_rdata may be invalid on a next rising edge of pb_clk 709 when pb_we, pb_ws, pb_re and pb_rs are not asserted and when wait is not active.

Figure 8:
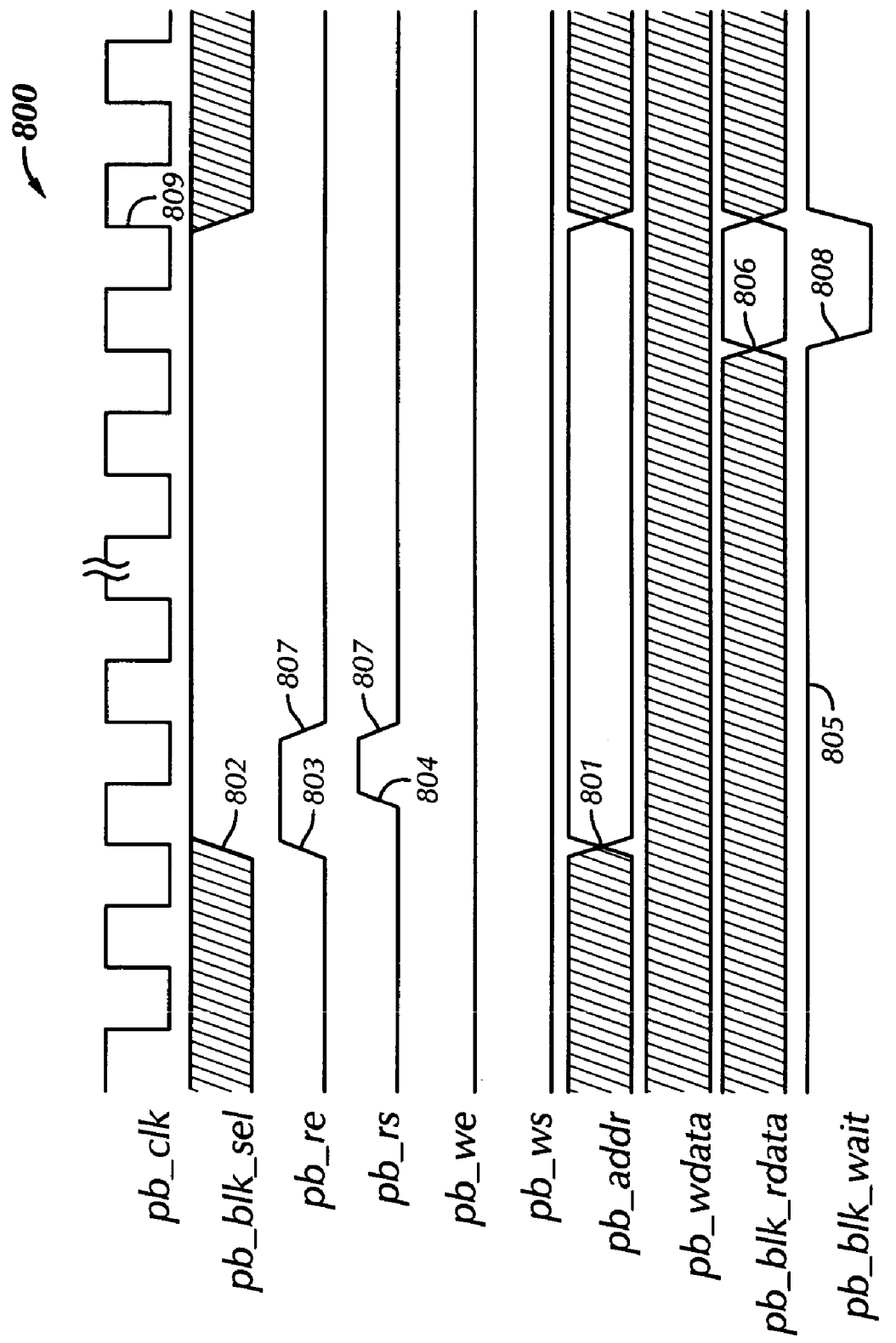
FIG. 8 is a timing diagram of a p-bus read, with synchronous wait, protocol embodiment of the present invention.

FIG. 8 represents the signal waveforms and timing for the p-bus read protocol with synchronous wait 800. This protocol illustrates a "normally not ready" system. The p-bus controller will ignore pb_blk wait except when the block, "blk", is being accessed. Signal pb_addr becomes valid 801 on a rising edge of pb_clk. A pb_blk_sel signal is also generated 802 along with pb_addr from the same address inputs. Signal pb_re is asserted 803 on a rising edge of pb_clk. Signal pb_rs is asserted 804 on a falling edge of pb_clk. If the block requires wait states, pb_blk_wait remains asserted 805 on a next rising edge of pb clk. Signal pb_blk_wait may be "normally true" if a wait will always be required. Signal pb_rdata is valid 806 before the first rising edge of pb_clk where pb_blk_wait is negated. The pb_re and pb_rs will be negated 807 on a next rising edge of pb_clk. If the block requires wait states, pb_blk_wait is negated 808 when the read data is ready. Signals pb_addr, pb_blk_sel, pb_wdata and pb_rdata may be invalid on a next rising edge of pb_clk 809 when pb_we, pb_ws, pb_re and pb_rs are not asserted and when wait is not active.

Figure 9:
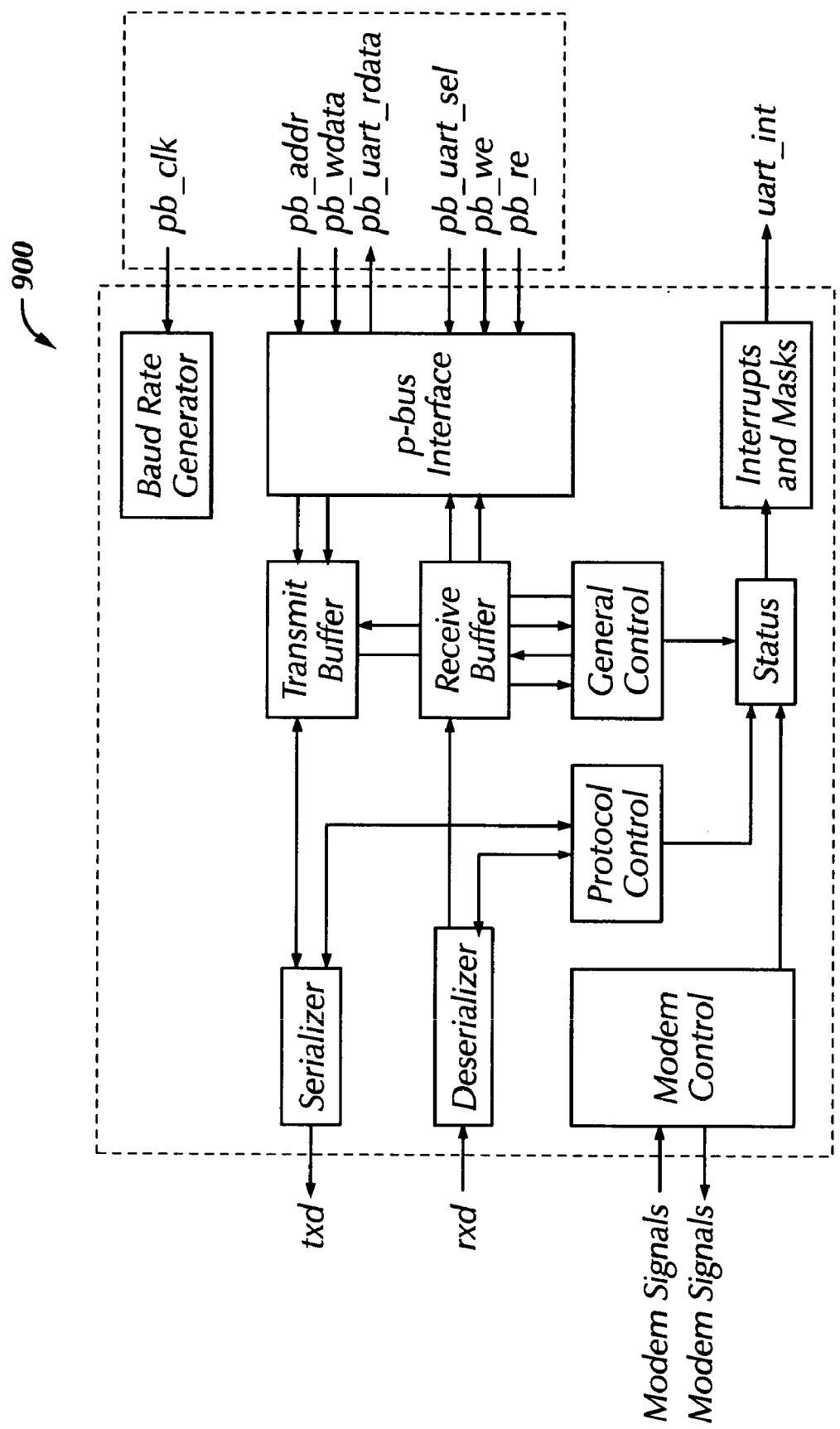
FIG. 9 is a functional block diagram of a UART embodiment of the present invention.

FIG. 9 represents a p-bus interconnection example for a universal asynchronous receiver transmitter (UART) 900. A UART is commonly used for software debug and as a general-purpose communications interface. A standard 16450-type UART is illustrated in FIG. 9. A more complex UART may include a DMA channel, e.g., which interfaces to the m-bus 130 (FIG. 1).

Referring again to FIG. 1, the m-bus supports communication between shared memory and channels or DMA peripherals. It operates synchronous to the MAC 146. The data and address widths are application-specific. Hidden arbitration is preferably used for DMA bus masters with no additional clock signal cycles needed for arbitration. Dynamically variable pipelining is preferably used. The m-bus allows read-modify-write cycles without bus lock. The m-bus 130 is the interface for communication to shared memory through the MAC 140. The processor(s) and other blocks that need to directly access shared memory (DMA) use the m-bus 130. The m-bus 130 is preferably an initiator-target interface, which supports multiple initiators, DMA peripherals (channels), and one target, the MAC 140. The m-bus 130 timings are synchronous with the MAC 140.

From a physical perspective, m-bus signals (excluding the bus clock, mb_clk) fall into the following two general categories: signals that are broadcast from the MAC 140 to all DMA peripherals, and "blk" signals that are sent point-to-point between the MAC 140 and a specific DMA peripheral. From a functional perspective, again excluding the m-bus clock, all m-bus signals are considered to be one of three types of signals: address signals that transfer address information (mb_addr and mb_blk_incaddr); transaction control signals that transfer information relating to a specific transaction or series of transactions (mb_blk_req, mb_blk_gnt, mb_blk_ir, mb_blk_size, mb_blk_burst, mb_blk_qual, mb_blk_stb, mb_blk_laststb and mb_done); and data signals (mb_blk_wdata and mb_rdata). See Tables III and IV.

TABLE III

M-bus Signal Summary

| Signal | Direction | Required | Timing | Description |
|---|---|---|---|---|
| mb_clk | n/a | yes | n/a | MAC clock |
| mb_blk_req | MAC-to-peripheral | yes | early, first 30% of clock cycle | Memory access request |
| mb_blk_gnt | peripheral-to-MAC | yes | early, first 30% of clock cycle | Memory access grant |
| mb_blk_dir | peripheral-to-MAC | no | mid, first 60% of clock cycle | 1 = memory write; 0 = memory read, expands to mb_blk_dir [1:0] where '1x' = read-modify-write |
| mb_blk_addr | peripheral-to-MAC | no | mid, first 60% of clock cycle | Memory address |
| mb_blk_size | peripheral-to-MAC | no | mid, first 60% of clock cycle | Size of access, in bytes |
| mb_blk_wdata | peripheral-to-MAC | yes, for write-only, and read/write block | early, first 30% of clock cycle | Write data from CPU |
| mb_blk_burst | peripheral-to-MAC | no | early, first 30% of clock cycle | Memory burst request |
| mb_rdata | MAC-to-peripheral | yes | early, first 30% of clock cycle | Memory read data |
| mb_blk_qual | MAC-to-peripheral | yes | early, first 30% of clock cycle | Memory access in progress |
| mb_stb | MAC-to-peripheral | yes | early, first 30% of clock cycle | Memory data strobe |
| mb_laststb | MAC-to-peripheral | no | early, first 30% of clock cycle | Last memory data strobe of grant |
| mb_done | MAC-to-peripheral | yes | early, first 30% of clock cycle | Memory arbitration request processed |
| mb_incaddr | MAC-to-peripheral | yes | early, first 30% of clock cycle | Memory address increment |

TABLE IV

M-bus Signal Descriptions

| Signal | Description |
|---|---|
| mb_clk m-bus clock | All m-bus 130 signals are synchronous to the mb_clk. It is this clock signal that is preferably used by the MAC 140. This signal may be generated and distributed by the MAC 140, or may be generated by a clock signal control module and distributed to the MAC 140 and other modules. |
| mb_blk_req m-bus 130 memory request | The memory request signal is preferably used to indicate that a DMA peripheral wishes to access external memory. All DMA peripherals must provide a memory access request. This signal is preferably asserted when an access to memory is needed and must remain asserted until at least one arbitration request is processed. It may be asserted at any time (synchronous with the mb_clk) but may be negated in any clock signal cycle where mb_done is preferably asserted. Memory access will switch immediately to the next requestor. For non-burst transfers, mb_blk_req can be continuously asserted until no more data is needed. For burst transfers, mb_blk_req may be continuously asserted as long as more data is needed, but may be negated only at a burst boundary where mb_done is preferably asserted. If mb_blk_gnt is negated, the DMA peripheral must suspend access to memory, however it may continue to assert mb_blk_req. Note that at arbitration requests, processing may be complete before, concurrent with, or after data transfer. |
| mb_blk_gnt m-bus 130 memory grant | The memory grant signal is preferably used to indicate that a DMA peripheral is granted access to shared memory. A grant is provided to each DMA peripheral. This signal is preferably asserted when access to memory is granted to a DMA peripheral. It may be asserted at any time when mb_blk_req is preferably asserted and may be negated during any clock signal cycle where mb_done is preferably asserted. mb_blk_req may remain asserted if the requestor needs more accesses, however, it must suspend all transactions until mb_blk_gnt is reasserted. If mb_blk_req is negated, mb_blk_gnt must be negated within the next clock signal cycle. All grants are normally mutually exclusive. Some architectures may benefit from having more than one grant simultaneously asserted, but this is not the usual case. If no requests are asserted, no grant is preferably asserted. The following signals from the MAC 140 are valid to a DMA peripheral only if mb_blk_gnt is preferably asserted: mb_done, mb_incaddr. |
| mb_blk_dir memory access direction | The memory access direction signal indicates whether the current access is a memory write or a memory read. All DMA peripherals that read and write external memory must provide a memory access direction. If a block only performs read operations or only performs write operations, this signal may be omitted from the interface. In an ASIC environment, this optimization may save logic. Encoding for mb_blk_dir is described below, mb_blk_dir is expanded to mb_blk_dir[1:0] in a system where read/modify/write is implemented. Without read/modify/write, mb_blk_dir = 0 for a read and 1 for a write. With read/modify/write, mb_blk_dir [1:0] = 00 for a read, 01 for a write, and 10 or 11 for a read/modify/write. This signal must be valid concurrent with or prior to the assertion of mb_blk_req and must remain valid until the access is complete. mb_blk_dir may change from one access to the next without negating mb_blk_req, but may only do so during a cycle where mb_incaddr is asserted. mb_blk_dir is ignored if mb_blk_gnt is not asserted. |
| mb_blk_addr memory address | The memory address is the address of the memory to be written or read. The start address is preferably application specific and may be relative to the beginning of shared memory, which may not be the same as the processor memory map address. All DMA peripherals that read or write shared memory must provide a memory address. This signal may be omitted from the interface if the block performs non-data accesses to memory, for example, the refresh DMA peripheral. In an ASIC environment, this optimization may save logic. This signal must be valid concurrent with or prior to the assertion of mb_blk_req. mb_blk_addr may change only during a cycle where mb_incaddr is preferably asserted. mb_blk_addr is ignored if mb_blk_gnt is not asserted. |
| mb_blk_size memory access size | The memory access size is preferably used in systems that allow an access to a subset of the bus width, for example, byte-write to 32-bit memory. This signal may be omitted for reads, if the entire bus width is preferably always read and the unneeded data ignored. Encoding of the access size may be application specific. The preferred encoding scheme for 32-bit data is mb_blk_size [1:0] of 00/01/10/11 for byte/word/doubleword/quadword. In general (word |

TABLE IV-continued

M-bus Signal Descriptions

| Signal | Description |
|---|---|
| | length = 16 bits), mb_blk_size = log$_2$(access-size/8), where access-size is in bits and is preferably an element of {2n, n > 3}. Expanding mb_blk_size to 3 bits accommodates systems with bus widths up to 1024 bits. All DMA peripherals that may write to a subset of the external memory bus width must provide a memory access size. This signal may be omitted from the interface if the block only performs non-data accesses to memory or always accesses the full bus width. In an ASIC environment, this optimization may save logic. This signal must be valid concurrent with or prior to the assertion of mb_blk_req. mb_blk_size may change only during a cycle where mb_incaddr is preferably asserted. mb_blk_size is ignored if mb_blk_gnt is not asserted. mbblk size would not typically change during any set of transactions However if a DMA channel supports writes on any byte boundary, it may be necessary in order to align the accesses when the memory controller does not support misaligned accesses. This can be illustrated with a transfer of 10 bytes to 32-bit memory, starting at address "1". To complete the operation with a minimum number of accesses, the DMA channel would have to write 1 byte to address "1", 1 word to address "2", 1 doubleword to address "4", 1 word to address "8" and 1 byte to address "10". In this example, every access is preferably a different size. |
| mb_blk_burst memory burst operation | This signal is used to inform the MAC 140 that a burst transaction is being undertaken. It is asserted concurrent with or prior to the assertion of mb_blk_req and de-asserted in the clock signal cycle where the final mb_done of the burst is asserted. However, if another burst access is requested, it may remain asserted if mb_blk_req remains asserted. If the system implements variable burst lengths—that is, different burst lengths for different requestors, mb_blk_burst can be expanded: mb_blk_burst[2:0] |

| Pre-programmed burst size | | Variable burst sizes | |
|---|---|---|---|
| 0 | no bursting | 000 | no bursting |
| 1 | fixed-length burst | 001 | 2 burst accesses per burst |
| | | 010 | 4 burst accesses per burst |
| | | 011 | 8 burst accesses per burst |
| | | 100 | 16 burst accesses per burst |
| | | 101 | 32 burst accesses per burst |
| | | 110 | 64 burst accesses per burst |
| | | 111 | 128 burst accesses per burst |

| Signal | Description |
|---|---|
| | The mb_blk_burst signal is optional and is only meaningful if the memory controller and the addressed memories take advantage of it. If asserted, the memory transaction is assumed by the MAC 140 to be for a (pre-programmed) fixed number of accesses and the mb_blk_req signal cannot be negated before that many accesses are complete. For example, SDRAMs can be programmed for fixed burst sizes, on a end of a burst, the SDRAM will automatically precharge, allowing for more efficient use of the memory. Note: The MAC 140 may ignore mb_blk_burst when accessing memories that have no inherent bursting advantage. When accessing non-burst-capable memories, mb_laststb is asserted with each access. For maximum compatibility, a requestor does not assert mb_blk_burst unless accessing burst-capable memories. |
| mb_blk_wdata memory write data | All DMA peripherals that write to external memory must provide memory write data. If a block only performs read operations, this signal may be omitted from the interface. In an ASIC environment, this optimization may save logic. This signal must be valid concurrent with or prior to the assertion of mb_blk_req. mb_blk_wdata may change only during a cycle where mb_stb is asserted. mb_blk_wdata is ignored if mb_blk_gnt is not asserted. If a DMA peripheral writes a subset of the bus width (for example, byte write on a 32-bit bus), it will handle endian-ness. For example, for a 32-bit bus width, if the system is big endian, then for a byte write to byte 0, data is placed in the upper 8 bits of mb_blk_wdata. If the system is little endian, the byte is placed in the lower 8 bits of mb_blk_wdata. This is implemented by mirroring the byte across the entire bus. For a 16-bit access, the data is mirrored on the upper and lower 16 bits of mb_blk_wdata. Alternatively, the system may choose a single endian-ness rather than supporting both big and little endian modes. |
| mb_rdata memory read data | Memory read data is provided to all DMA peripherals that read from external memory. If a block only performs write operations, this signal may be omitted from its interface. This signal is valid on the rising edge of the mb_clk coincident with mb_stb. mb_rdata may change after this time. The falling edge of mb_stb may also be used to capture mb_rdata if mb_stb is glitch-free (note that, mb_rdata must be valid by the falling edge). Reads from memory may be done across the entire bus width. If a read is done on a subset of the bus width (for example, byte read on a 32-bit bus), the data may be mirrored across the entire bus to accommodate both big and little endian systems. For a 32-bit bus width, if the system is big endian, then a byte read from address 0 is read from the upper 8 bits of mb_rdata. If the system is little endian, the byte is read from the lower 8 bits of mb_rdata. |
| mb_blk_qual memory access control signal qualifier | The memory access qualifier is preferably used to indicate that a DMA peripheral has access to the external memory bus and that mb_stb and mb_laststb are valid for that DMA peripheral's access. mb_blk_qual is provided to each DMA peripheral. mbblk_qual is asserted when data is being transferred between the MAC 140 and a DMA peripheral. All mb_blk_qual signals are normally mutually exclusive. Some architectures may call for more than one access signal to be simultaneously asserted, but this is not the usual case. If no requests are asserted, no qualifiers are issued. |
| mb_stb and mb_lastb | These signals from the MAC 140 are valid to a DMA peripheral only if mb_blk_qual is asserted. These signals are ignored at all times when mb_blk_qual is not asserted. In general, there will be at least one clock signal cycle delay from mb_blk_req to mb_blk_gnt. Delay from mb_blk_gnt to the first mb_done is embodiment dependent. If mb_blk_req remains asserted, mb_done may be asserted every clock signal cycle (e.g. synchronous memories) and there is no overhead for any accesses other than the first. |
| mb_done memory arbitration request done | The memory arbitration request done indicates that a requested memory access has been started and the MAC 140 state machines are evaluating whether or not another memory cycle is needed. This signal is used by the DMA peripherals to determine when the request is negated, mb_blk_req negation must be coincident with mb_done. Signal mb_done is broadcast to all DMA peripherals. Each DMA peripheral must qualify the mb_done with its mb_blk_gnt before using it. Signal mb_blk_req is negated with enough setup time so that on a next rising clock signal edge, the MAC 140 state machines have decided whether or not to begin another memory access. Note, too, that due to the pipeline structure of some memories, data transfer |

TABLE IV-continued

M-bus Signal Descriptions

| Signal | Description |
|---|---|
| | may not be completed until several clock cycles after the corresponding arbitration signal, mb_done is asserted. |
| mb_incaddr memory address increment | The memory address increment signal is used to provide the timing of address changes. Mb_incaddr is broadcast to all DMA peripherals and may or may not be coincident with any other signal. Each DMA peripheral must qualify mb_incaddr with its mb_blk_gnt before using it. If mb_blk_burst is asserted, the MAC 140 or accessed memory will automatically increment the address during the burst, thus mb_incaddr can be ignored by a requestor that always performs burst accesses to or from burst-capable memory, such as instruction cache fetches from SDRAM. |
| mb_stb memory data strobe | The memory data strobe indicates that data as been written to memory or that memory read data is available. Read data is valid on the falling edge of mb_stb or on the rising edge of the mb_clk coincident with mb_stb. If mb_stb is glitch-free, it may be used to latch mb_rdata if necessary. Signal mb_stb is broadcast to all DMA peripherals. Each DMA peripheral must qualify the mb_stb with its mb_blk_qual before using it. |
| mb_laststb last memory data strobe | The last memory data strobe indicates that a current mb_stb is the last strobe of the current burst. If mb_blk_burst is not asserted or, if asserted with non-bursting memory accesses, mb_laststb will be asserted each time that mb_stb is asserted. This signal may be omitted if not needed. mb_laststb is broadcast to all DMA peripherals and is coincident with mb_stb. Each DMA peripheral must qualify the mb_laststb with its mb_blk_qual before using it. mb_laststb may be used by the DMA peripherals to update status. It may also be used to eliminate the need for separate burst status in the DMA peripheral, saving some logic. |

The m-bus 130 preferably supports variable pipelining. The pipeline controls are mb_done, mb_incaddr and mb_stb. With these signals separated, it is easier to accommodate many interface timings. Since these control signals are independent, requestors must not make any assumptions about their relative timings. That is, there is no fixed order to their assertion. Because the pipelining is variable, optimized to the timings of the requested memory, arbitration may be performed during an outstanding data transaction (hiding the arbitration process), and multiple m-bus 130 accesses may be started before the data for the first request is available or needed. Similarly, in any given clock signal cycle, the address may be several accesses in advance of the data or the data may be in advance of the address. If the accessed memory is not pipelined (such as flash memory), arbitration will still be pipelined, and thus hidden, but the address will generally be concurrent with the data.

The separation of controls simplifies the logic embodiment for a requester, since mb_stb, mb_incaddr and mb_done accompany every access. In a typical system, a DMA channel stores write and read data in a FIFO. The data would be strobed to and from the FIFO using mb_stb, the memory address counter would be updated by mb_incaddr, and the request control logic would operate off of mb_done.

All m-bus 130 signals from the requester to the MAC 140 must be latched if the MAC 140 removes mb_blk_gnt before asserting mb_blk_qual because of the pipelining. This condition may occur if the MAC 140 or accessed memory is heavily pipelined and only a single access is requested. Similarly, the MAC 140 must maintain proper internal pipelining of the requestor's control signals.

In general for a synchronous embodiment, there will be at least one clock signal cycle delay from mb_blk_req to mb_blk_gnt. Delay from mb_blk_gnt to the first mb_done is dependent upon the implementation of the MAC 140 and the type of memory accessed. If mb_blk_req remains asserted, mb_done may be asserted every clock signal cycle and there is no overhead for any accesses except the first, because of the pipelining. Thus, latency may only be induced when switching requestors, memory types or access type.

If a requester only requires a single access per grant, mb_incaddr can be ignored, as it is preferably used for pipeline control only, not access or data control.

When a requestor accesses asynchronous SRAM, the address and write data will be needed on a beginning of the cycle, and remains unchanged until the end of the cycle. Thus mb_done, mb_incaddr and mb_stb would occur on the end of the cycle.

When a requestor accesses EDO DRAM, the address needs to be updated before the end of the cycle in order to provide setup time for the next access. Signal mb_incaddr can occur up to three clock signal cycles before the mb_stb, depending on the embodiment. Due to setup and hold requirements, the address would consistently lead the strobe, effecting a pipeline. Signal mb_done will be asserted anywhere between the mb_incaddr and mb_stb depending on the needs of the controlling state machine. For all accesses of the same type to the same memory, the timing will be constant, however the timing will generally vary between access types (read, write, read/modify/write) and may vary depending upon the access size and burst type.

Implementations of the m-bus 130 and arbiter 142 are application specific. The arbiter 142 takes as input a request from each initiator and responds with a grant. The m-bus 130 implements hidden arbitration, that is, no specific clock signal cycles are dedicated to arbitration. Arbitration will occur when any request is negated and the current memory access is finished. Arbitration type may be round robin, timed, fixed-priority, rotating priority, or others, depending on the needs of the system. Depending upon the specific application and the parameters of a specific request, the present invention's hidden arbitration methodology enables grant, arbitration, and data transfer to occur within the same clock cycle.

The m-bus arbitration requires that each requestor have a request, rnb_blk_req, and a grant, mb_blk_gnt. The mb_blk_req signal may be asserted at any time, but must remain asserted until at least one access has been granted. The mb_blk_req signal must be negated only when an mb_done is received. The mb_blk_gnt signal may be negated at any time. If mb_blk_gnt is negated, mb_blk_req may remain asserted.

Arbiter 142 control signals are necessarily specific to the particular application. Arbitration evaluation may be done using mb_done, or other signals generated by the MAC 140 may be used.

Figure 10:
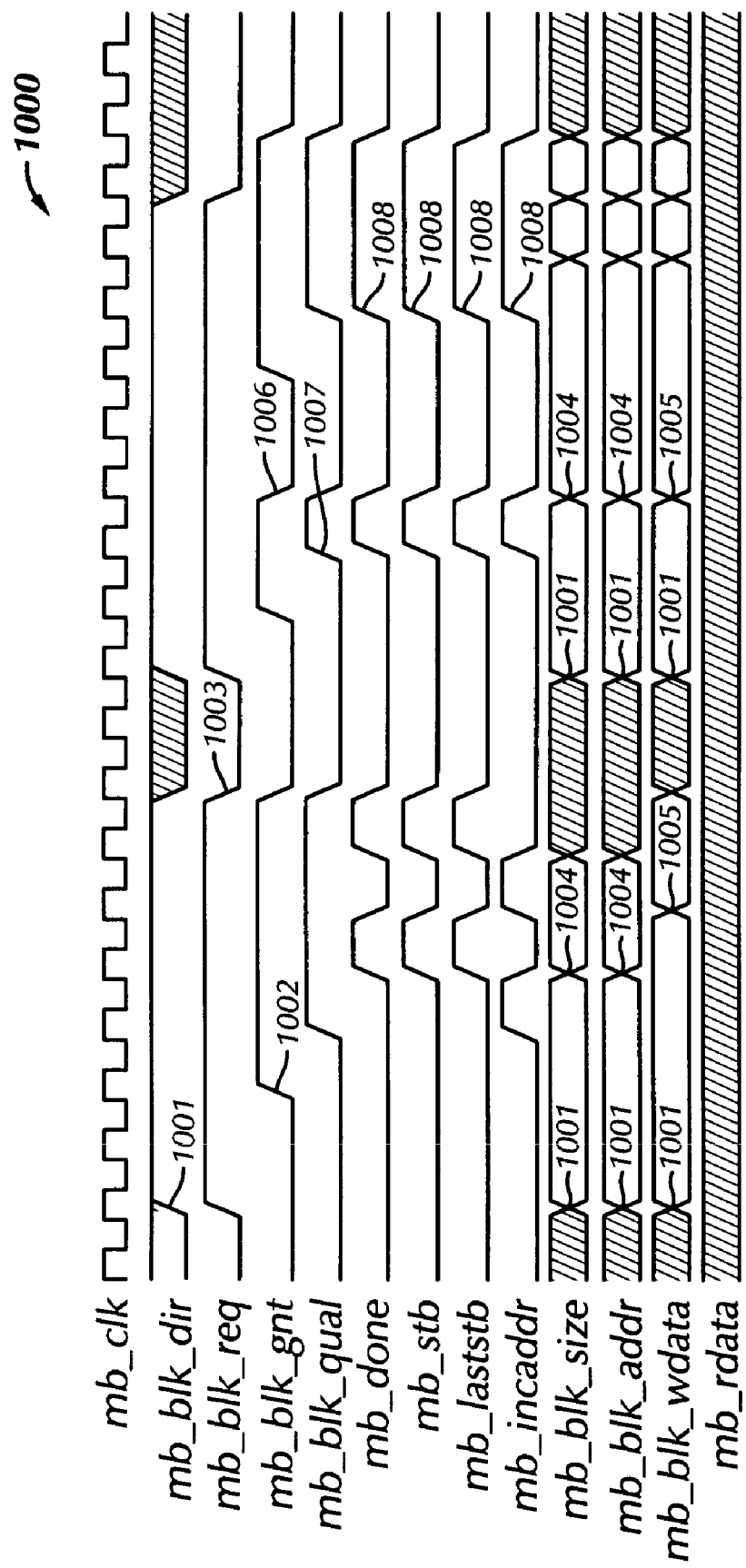
FIG. 10 is a timing diagram of an m-bus non-burst write protocol embodiment of the present invention.

FIG. 10 represents the signal timing for m-bus memory write cycles 1000. Signal mb_blk_dir, mb_blk_size mb_blk_addr and mb_blk_wdata are valid 1001 at mb_blk_req assertion. Signal mb_blk_req may not be negated without at least one access. When memory is available mb_blk_gnt is asserted 1002. Signal mb_blk_req is negated 1003 during a cycle when mb_done is asserted. Signal mb_blk_addr and mb_blk_size are updated 1004 during a cycle where mb_incaddr is asserted. Signal mb_blk_wdata is updated 1005 during a cycle where mb_stb is asserted. Signal mb_blk_gnt may be negated 1006 before all requested data has been transferred. Signal mb_blk_req may remain asserted. Signal mb_blk_gnt frames all mb_done and mb_incaddr signals corresponding to an access, and mb_$_{blk}$_qual 1007 frames all mb_stb and mb_laststb signals corresponding to an access. Signals mb_incaddr, mb_done, mb_stb, and mb_laststb may be active continuously 1008 if each access is completed in one clock signal cycle.

Figure 11:
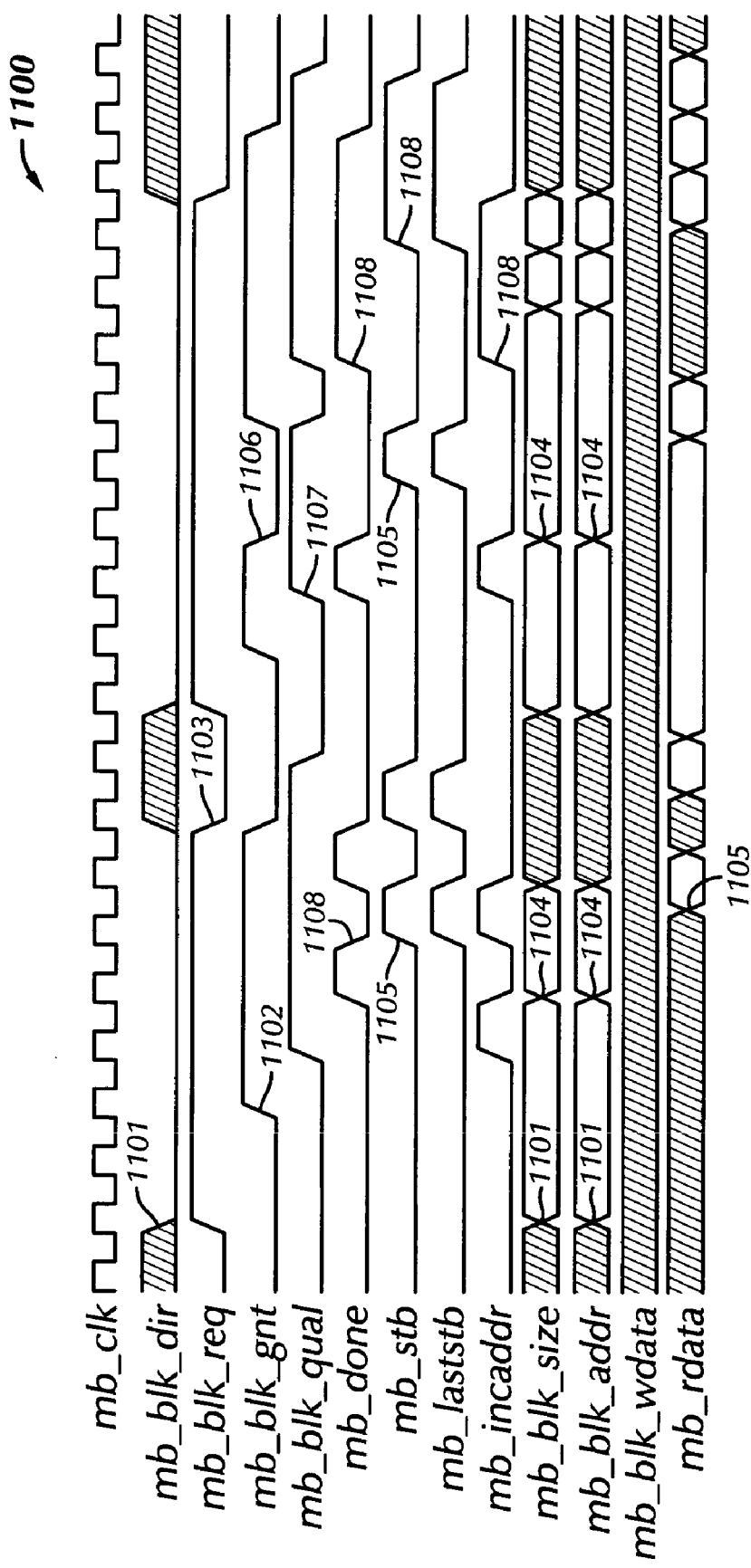
FIG. 11 is a timing diagram of an m-bus non-burst read protocol embodiment of the present invention.

FIG. 11 represents the signal timing for m-bus memory read cycles 1100. Signals mb_blk_dir, mb_blk_size, and mb_blk_addr are valid 1101 at mb_blk_req assertion. Signal mb_blk_req may not be negated without at least one access. When memory is available mb_blk_gnt is asserted 1102. Signal mb_blk_req is negated 1103 during a cycle when mb_done is asserted. Signals mb_blk_addr and mb_blk_size are updated 1104 during a cycle where mb_incaddr is asserted. Signal mb_rdata is valid 1105 on a rising edge of mb_clk where mb_stb is asserted. If pipelined memory is used, mb_stb may not occur until several clock signal cycles after mb_done. Signal mb_blk_gnt may be negated 1106 before all requested data has been transferred. Signal mb_blk_req may remain asserted. Signal mb_blk_gnt frames all mb_done and mb_incaddr signals corresponding to an access, and mb_blk_qual 1107 frames all mb_stb and mb_laststb signals corresponding to an access. Signals mb_incaddr, mb_done, and mb_stb may be active continuously 1108 if each access is completed in one clock signal cycle. Note that another requester's request signal, mb_xxx_req, may be asserted at any time. Its corresponding grant, mb_xxx_gnt, may be asserted at the same time the depicted grant, mb_blk_gnt, is negated. In this case, arbitration for block xxx's upcoming transaction would overlap with the data transfer to the block that requested the read data cycle shown in FIG. 11.

Figure 12:
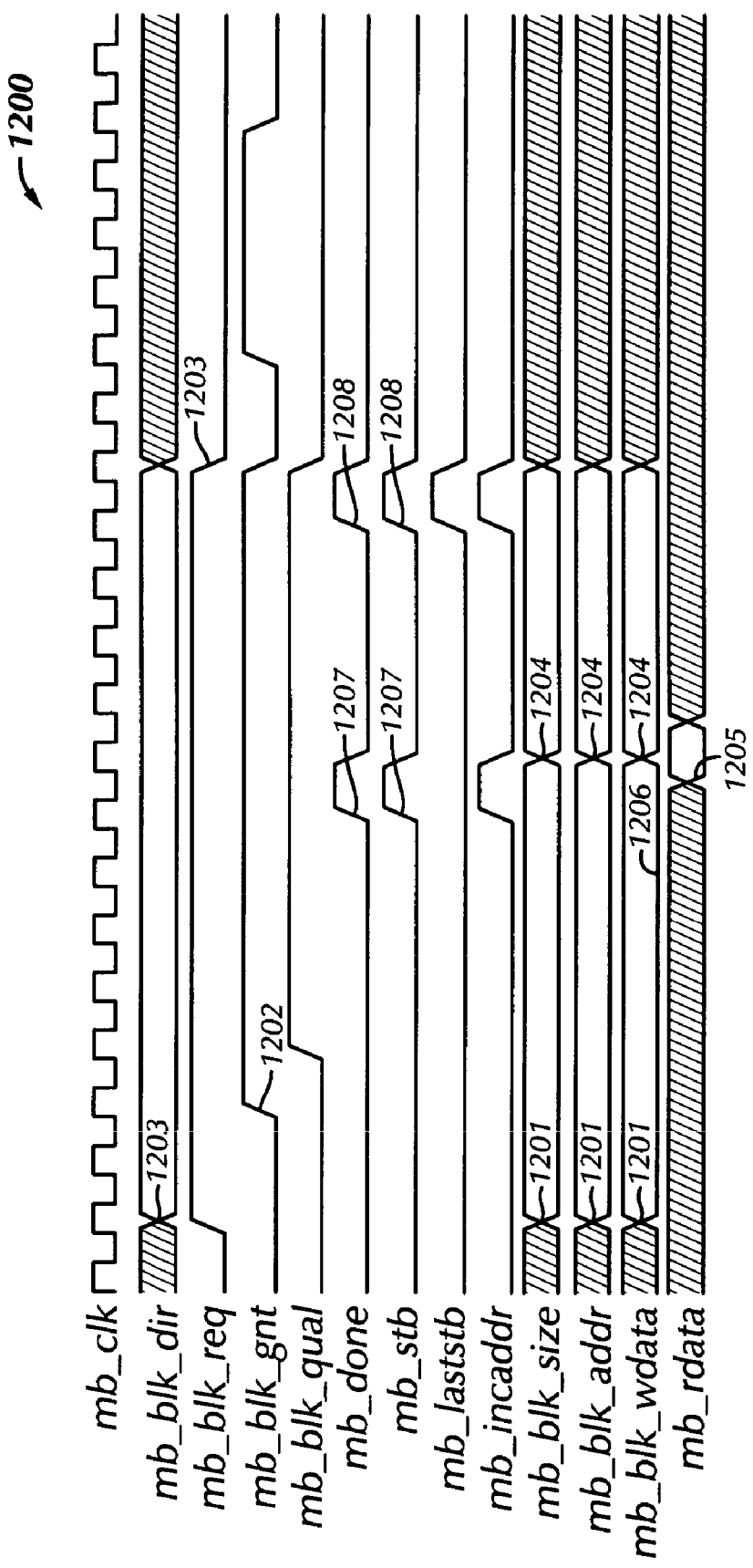
FIG. 12 is a timing diagram of an m-bus read-modify-write protocol embodiment of the present invention.

FIG. 12 represents the signal timing for m-bus memory read-modify-write cycles 1200, where mb_blk_dir is extended to two bits to indicate read, write or read-modify-write operation. For read-modify-write cycles, mb_blk_wdata behavior is modified. Signal mb_blk_wdata is the result of a data mask applied to mb_rdata. Signals mb_blk_dir, mb_blk_size, mb_blk_addr, and mb_blk_wdata are valid 1201 at mb_blk_req assertion, mb_blk_req may not be negated without at least one access. When memory is available mb_blk_gnt is asserted 1202. Signal mb_blk_req is negated 1203 during a cycle when mb_done is asserted 1208. Signal mb_blk_addr and mb_blk_size are updated 1204 in the clock signal cycle where mb_incaddr is active. The data mask is updated in the clock signal cycle where mb_stb is active and when signal mb_rdata becomes valid 1205. The data mask must combinationally modify mb_rdata in the DMA peripheral since there is no indication to the requestor when the read cycle is complete. The result of the mask is returned as mb_blk_wdata 1206. Signal mb_blk_gnt frames all mb_done and mb_incaddr signals corresponding to an access 1207, and mb_blk_qual frames all mb_stb and mb_laststb signals corresponding to an access 1208. A write cycle is complete when mb_stb or mb_done are asserted 1207, or when mb_stb and mb_done are asserted simultaneously 1208.

Figure 13:
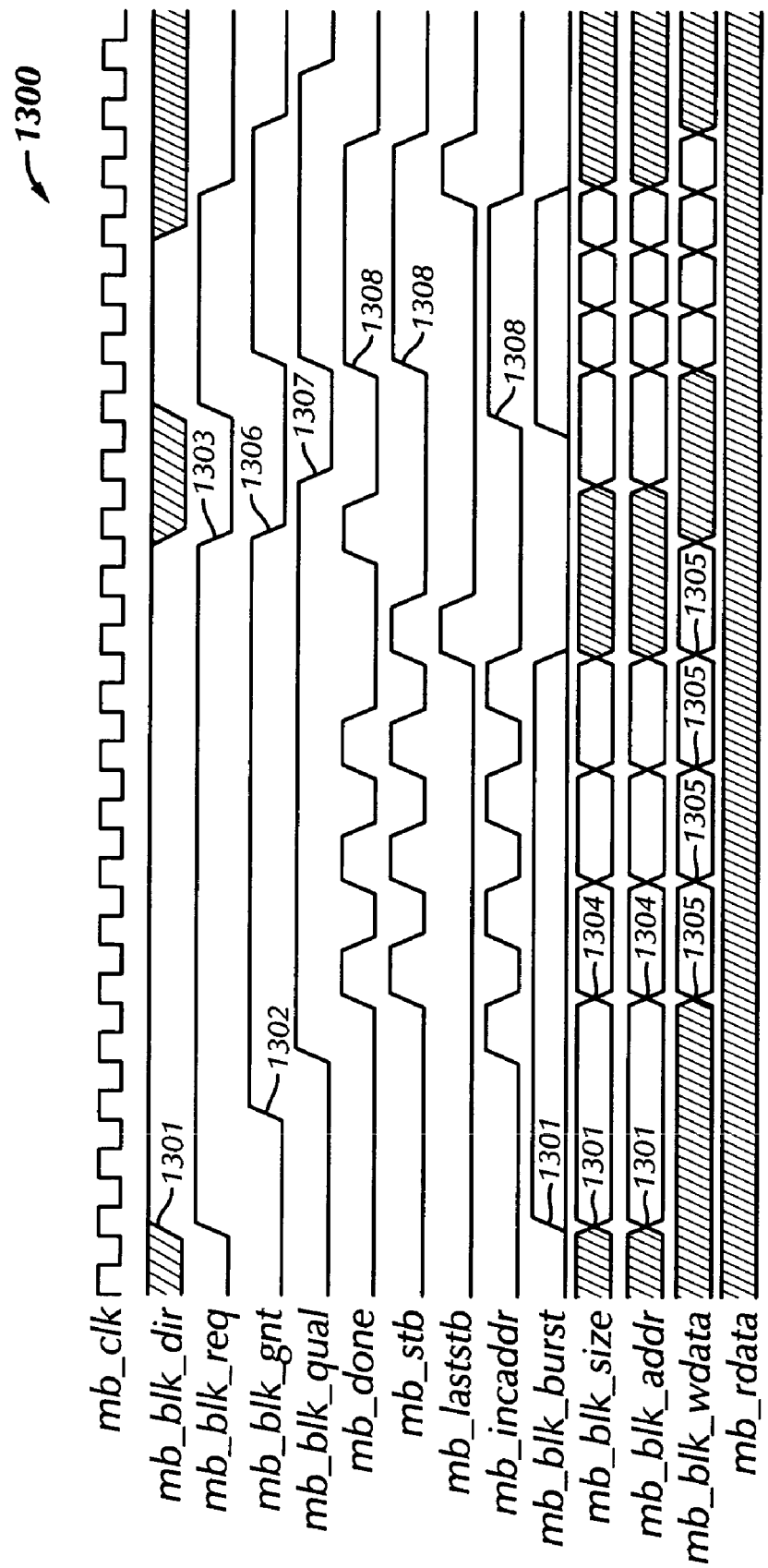
FIG. 13 is a timing diagram of an m-bus memory burst write protocol embodiment of the present invention.

FIG. 13 represents the signal timing for m-bus memory write cycles 1300. Signals mb_blk_dir, mb_blk_size, and mb_blk_addr are valid 1301 at mb_blk_req assertion. Signal mb_blk_req may not be negated without at least one access. When memory is available mb_blk_gnt is asserted 1302. Signal mb_blk_req is negated 1303 during a cycle when mb_done is asserted. Signals mb_blk_addr and mb_blk_size are updated 1304 during a cycle where mb_incaddr is asserted. Signal mb_blk_wdata is updated 1305 during a cycle where mb_stb is asserted. Signal mb_blk_gnt may be negated 1306 before all requested data has been transferred. Signal mb_blk_req may remain asserted. Signal mb_blk_gnt frames all mb_done and mb_incaddr signals corresponding to an access, and mb_blk_qual 1307 frames all mb_stb and mb,laststb signals corresponding to an access. Signals mb_incaddr, mb_done, and mb_stb may be active continuously 1308 if each access is completed in one clock signal cycle.

Figure 14:
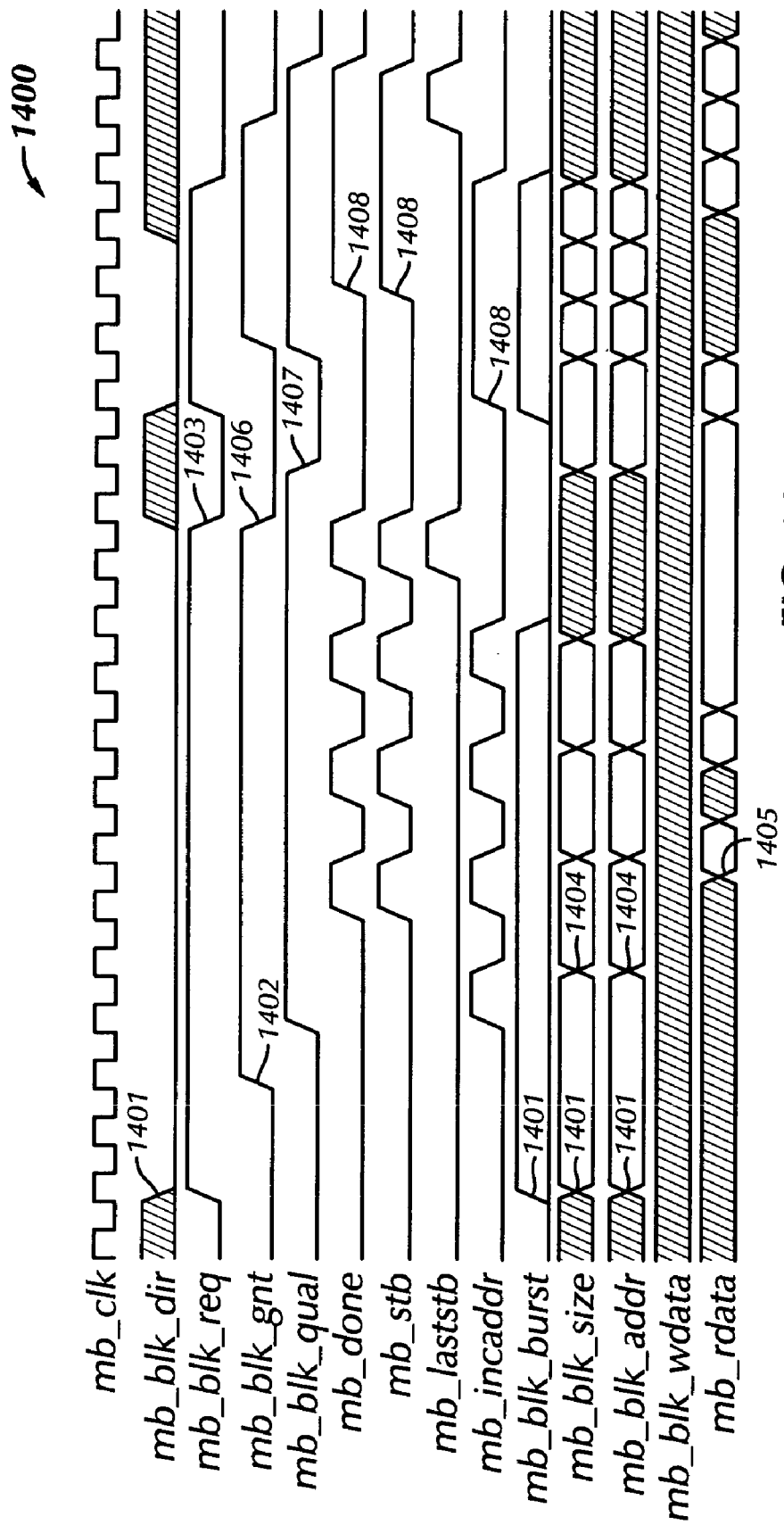
FIG. 14 is a timing diagram of an m-bus memory burst read protocol embodiment of the present invention.

FIG. 14 represents the signal timing for m-bus memory burst read cycles 1400. Signals mb_blk_dir, mb_blk_size, mb_blk_addr, mb_blk_burst, and mb_blk_wdata are valid 1401 at mb_blk_req assertion. Signal mb_blk_req may not be negated without at least one access. When memory is available mb_blk_gnt is asserted 1402. Signal mb_blk_req is negated 1403 during a cycle when mb_done is asserted. Signal mb_blk_addr and mb_blk_size are updated 1404 during a cycle where mb_incaddr is asserted. Signal mb_rdata is valid 1405 on a rising edge of mb_clk where mb_stb is asserted. If pipelined memory is used mb_stb may not occur until several clock signal cycles after mb_done. Signal mb_blk_gnt may be negated 1406 before all requested data has been transferred. Signal mb_blk_req may remain asserted. Signal mb_blk_gnt frames all mb_done and mb_incaddr signals corresponding to an access, and mb_blk_qual 1407 frames all mb_stb and mb_laststb signals corresponding to an access. Signal mb_incaddr, mb_done, and mb_stb may be active continuously 1408 if each access is completed in one clock signal cycle.

Figure 15:
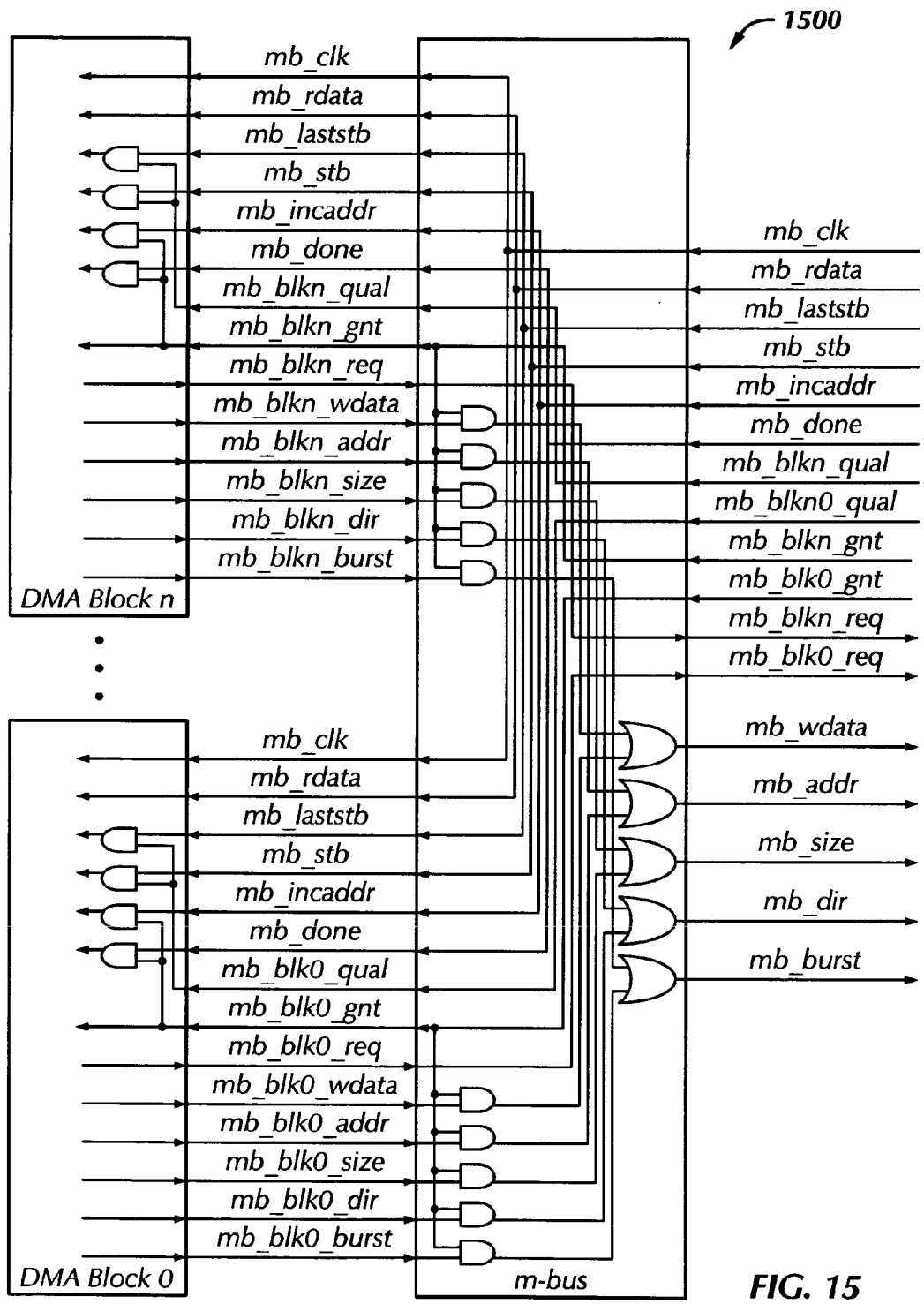
FIG. 15 is a functional block diagram of an implementation of the unidirectional bus architecture of the present invention.

FIG. 15 illustrates an m-bus interconnection 1500. Logic "AND-OR" gates are used instead of multiplexers. This implementation promotes design friendliness, enhances performance, and reduces bus loading while eliminating bus turnaround.

The m-bus outputs from the DMA blocks are not qualified, rather they are logically AND'ed with mb_blk_gnt then OR'd together with the m-bus block.

The VSI alliance (VSIA) on-chip bus (OCB) development working group issued version 1.0 of the on-chip bus attributes specification, OCB 1 1.0. Herein is defined a minimum set of attributes for OCB architectures used to integrate virtual components (VCs).

TABLE V

General Attributes

| technical attribut | m-bus | p-bus |
| --- | --- | --- |
| type bus | DMA bus | peripheral bus |
| address | yes - system specific | yes - peripheral specific |
| data | yes - scaleable | yes - scaleable |
| transfer width | yes - scaleable | yes - scaleable |
| command | yes - read, write, r-m-w | yes - read, write |
| lock | no - not needed | no - only one bus master |
| errors | no | no - handled by master |
| command | no | no |
| data | no | no |
| timing | no | no |
| broadcast | no | no |
| status | yes | yes - wait |
| arbitration | yes | no |
| request | yes | no |
| grant | yes | no |
| pre-empt | yes | no |
| cache support | yes | no |
| user specifiable bits | yes - user can add signals | yes - user can add signals |
| routing | no | no |

TABLE V-continued

General Attributes

| technical attribut | m-bus | p-bus |
|---|---|---|
| route type | no | no |
| split transactions | no | no |
| burst transactions | yes | no |

TABLE VI

Un-cached transactions

| t chnical attribute | m-bus | p-bus |
|---|---|---|
| write unlocked | yes | yes |
| read unlocked | yes | yes |
| read locked | no | no |
| write locked | no | no |
| address-only unlocked | yes - idle is possible | yes - idle is possible |
| address-only locked | no | no |
| write response | no | no |
| read response | no | no |
| write no acknowledge | no | yes - no handshake |
| I/O read | no - memory mapped | no - memory mapped |
| I/O write | no - memory mapped | no - memory mapped |
| configuration read | no - memory mapped | no - memory mapped |
| configuration write | no - memory mapped | no - memory mapped |
| read-modify-write | yes | no |

TABLE VII

Cached transactions

| technical attribute | m-bus | p-bus |
|---|---|---|
| cache read | no | no |
| cache write | no | no |
| cache update | no | no |
| memory read line | no | no |
| memory write and invalidate | no | no |
| cache coherency | no | no |

TABLE VIII

Interrupts

| t chnical attribute | m-bus | p-bus |
|---|---|---|
| interrupt | no - separate from bus | no - separate from bus |
| synchronous | n/a | n/a |
| asynchronous | n/a | n/a |
| level | n/a | n/a |
| edge | n/a | n/a |
| interrupt acknowledge | n/a | n/a |

TABLE IX

Additional transactions

| t chnical attribute | m-bus | p-bus |
|---|---|---|
| memory spaces bus transactions | 1 - single memory space | 1 - single memory space |
| disconnect | no - not applicable | no - not applicable |
| error | no - not applicable | no - not applicable |
| retry | no - not applicable | no - not applicable |
| retract | no - not applicable | no - not applicable |

TABLE IX-continued

Additional transactions

| t chnical attribute | m-bus | p-bus |
|---|---|---|
| system events | | |
| reset | yes | yes |
| initialize | no - not needed | no - not needed |
| configure | no - not needed | no - not needed |
| clock signaling scheme | yes | yes |

TABLE X

Implementation and Other Attributes

| technical attribut | m-bus | p-bus |
|---|---|---|
| structure | | |
| number of masters | multi-master (no max) | single master |
| number of targets | 1 - memory controller | multi-target no max |
| performance | 100% usable cycles | 100% usable cycles |
| physical implementation | | |
| maximum masters | no maximum | single master |
| maximum targets | single slave | no maximum |
| average master gate count | application dependent | depends on number of targets |
| average target gate count | depends on number of masters | application dependent |
| average master latency | application dependent | zero |
| average target latency | application dependent | target dependent |
| average bandwidth | application dependent | application dependent |
| peak bandwidth | width/clock signal dependent | width/clock signal dependent |
| dynamic bus sizing | no | no |
| device width—target | scaleable | scaleable |
| device width—master | scaleable | scaleable |
| synchronous | yes - to rising edge clock signal | yes - to rising edge clock signal |
| byte replication | no | yes |
| data bus implementation | distributed and/or | distributed and/or |
| timing guidelines | yes (early, mid, late) | yes (early, mid, late) |
| DMA peripheral transfers | yes | no |
| address pipelining | yes - decoupled address/data | no |
| overlapped read/write | yes - decoupled read/write data buses | no |
| late master abort | no | no |
| read word address | no | no |
| guarded transfers | no | no |
| compressed transfers | no | no |
| ordered transfers | no | no |
| target busy signals | no | yes - wait |
| master latency signals | no | no |
| no tri-states | yes | yes |
| positive edge clock signaling only | yes | yes |
| power down | n/a | n/a |

Implementations of the present invention can include the two main processor architectural types, Von Neumann and Harvard. The Von Neumann architecture uses one bus for instruction fetches and data operations. A Harvard architecture uses separate buses to carry instruction fetches and data operations, and so these can operate simultaneously. Most digital signal processors use the Harvard architecture. Embodiments of the present invention can use either processor architecture and multiple processors. A switched channel memory controller can be used for concurrent communication between different DMA devices and internal or external memories, when bandwidth is critical and multiple shared memories are needed.

Embodiments of the present invention are channel based, and so can accommodate multiple clock signal domains with synchronization FIFOs that allow speed matching without loss of throughput.

Figure 16:
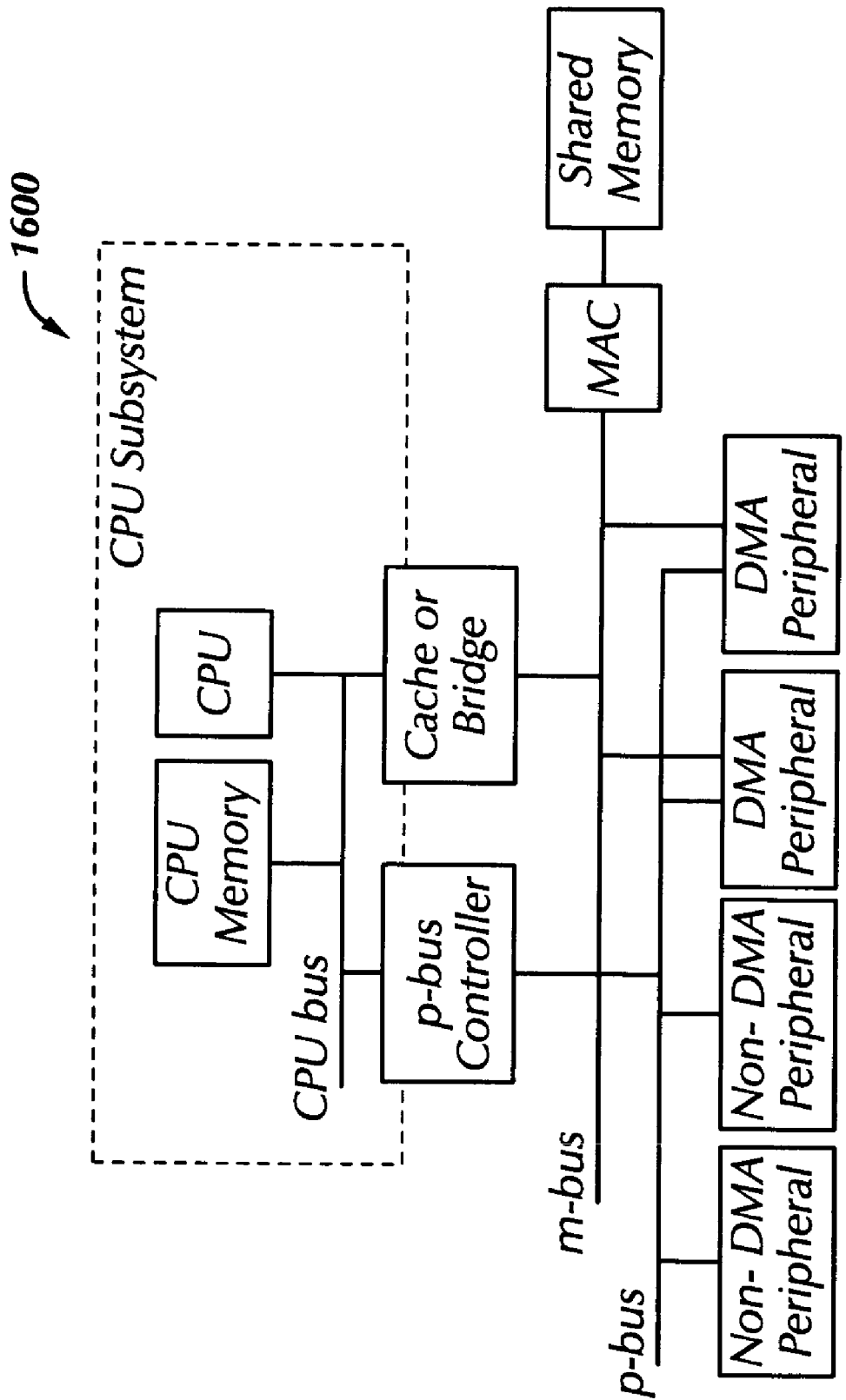
FIG. 16 is a functional block diagram of a Von Neuman processor embodiment of the present invention.

A common embodiment of the present invention embeds a single Von Neumann processor with application-specific peripherals. Typical applications include games, organizers, appliances and network controllers. Since a Von Neumann processor uses the same bus for instruction and data operations, FIG. 16 shows a processor's external bus connected to both a p-bus controller, for access to the peripherals, and to a cache, or m-bus bridge if no cache is needed for access to shared memory. Memory accesses are made for data and instructions.

Figure 17:
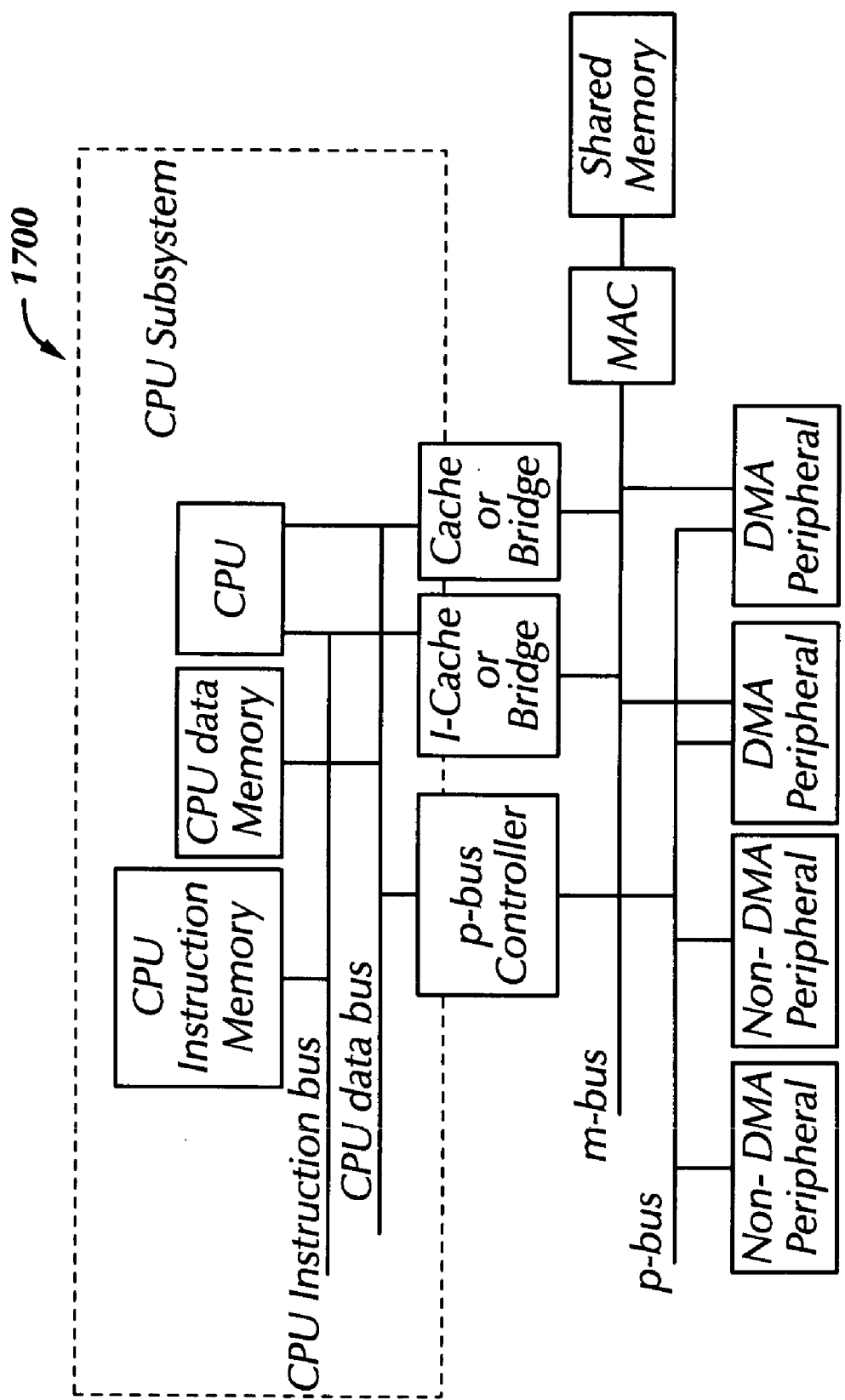
FIG. 17 is a functional block diagram of a Harvard processor embodiment of the present invention.

When large amounts of time-critical data processing need to be done by a processor, a system as illustrated in FIG. 17 can be implemented with a single Harvard architecture processor. Typical applications include image processors and servo controllers. Both of a processor's external buses are connected to dedicated memory. A p-bus controller is connected to a data bus only since the processor never fetches instructions across the p-bus. Both the instruction bus and data bus are connected to a cache for access to shared memory (or m-bus bridge if no cache is needed). Additional channels can be added to a memory access controller for a second CPU bus without requiring changes.

Figure 18:
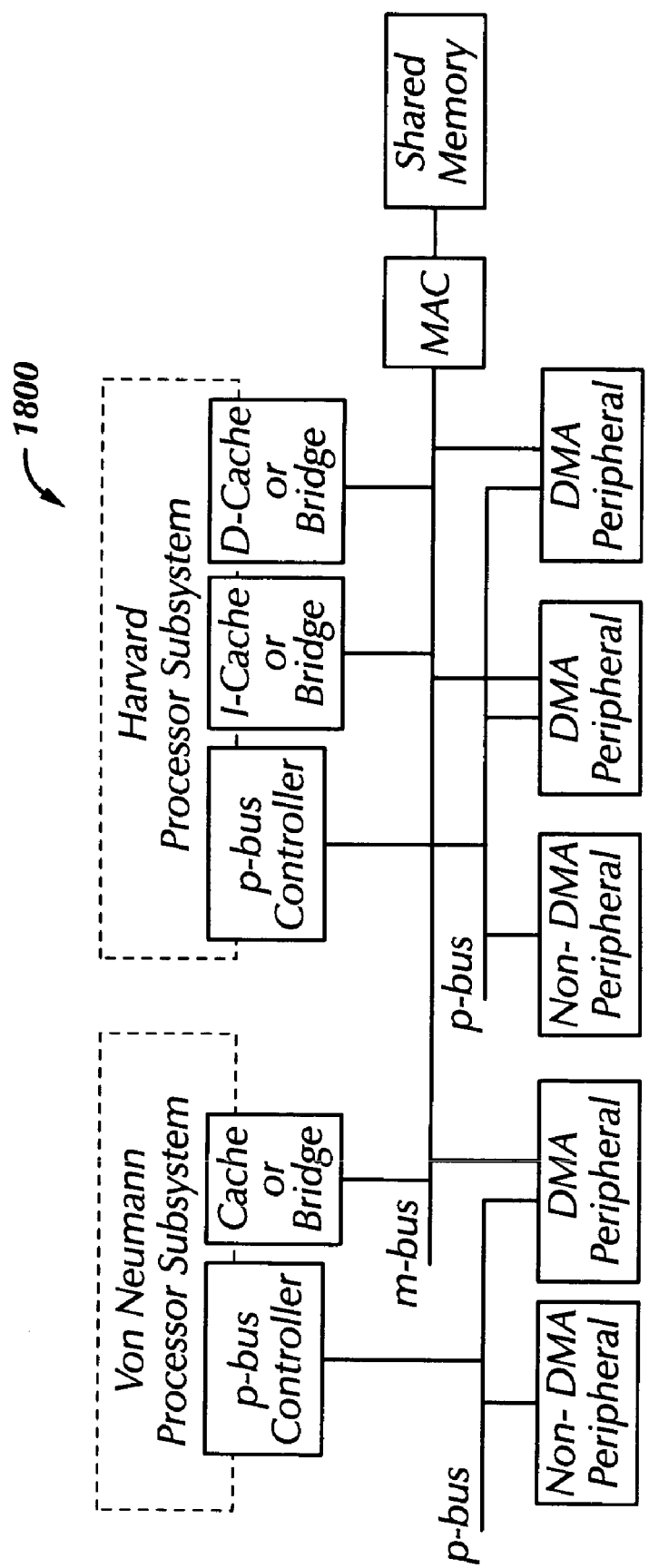
FIG. 18 is a functional block diagram of a dual processor embodiment of the present invention.

FIG. 18 shows a dual processor application. Many systems require both time-critical data processing and significant peripheral control. In these systems, a dual-processor implementation can be advantageous. A Von Neumann processor is preferably used for control functions, since these processors are more compact than Harvard architecture processors. A Harvard architecture processor is preferably used for data processing. Typical dual-processor applications include cellular phones, digital cameras and graphics processing. The peripherals used by the control processor are independent of those used by the data processor. Thus, the system is implemented with two p-buses. Additional channels can be added to the memory access controller for the control processor.

Figure 19:
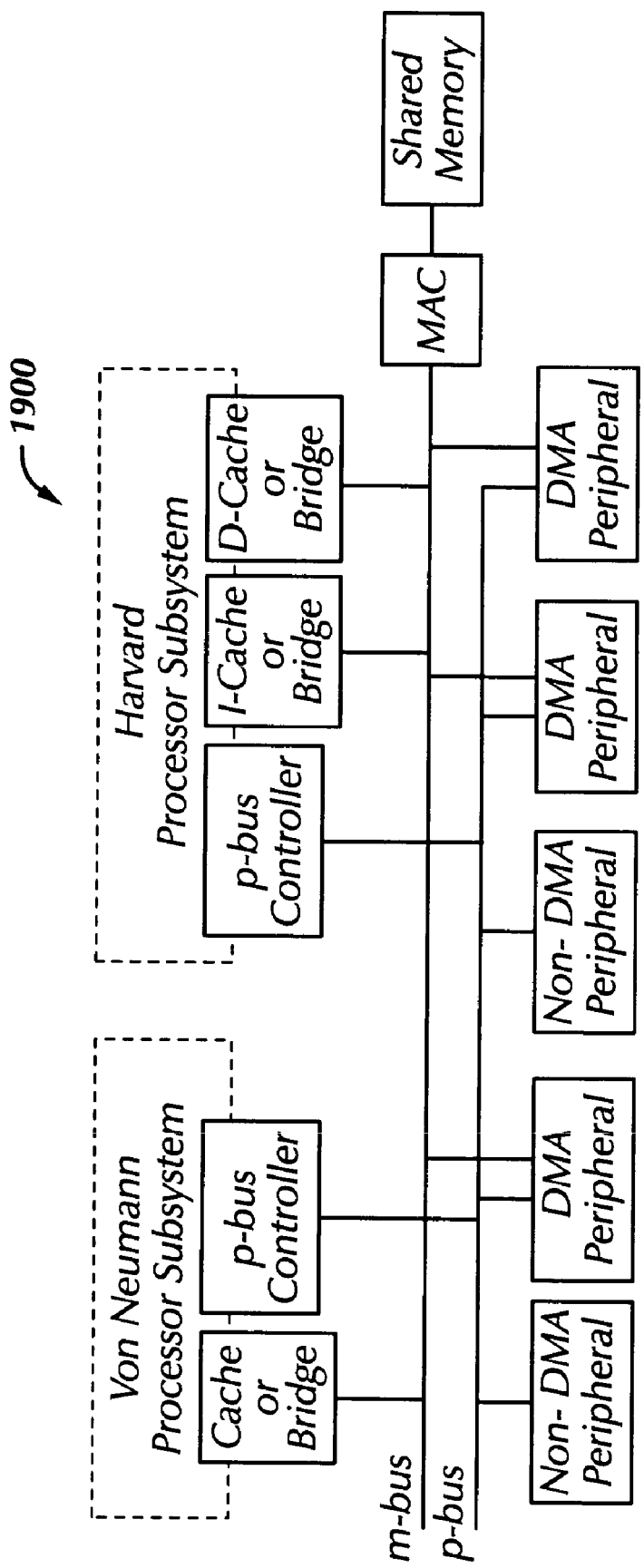
FIG. 19 is a functional block diagram of a dual processor and shared p-bus embodiment of the present invention.

FIG. 19 represents embodiments of the present invention with dual processors and a shared p-bus. Either processor can use peripherals, and a p-bus controller with arbitration is preferably used. Access to shared peripherals is controlled using software, for example via semaphores.

Figure 20:
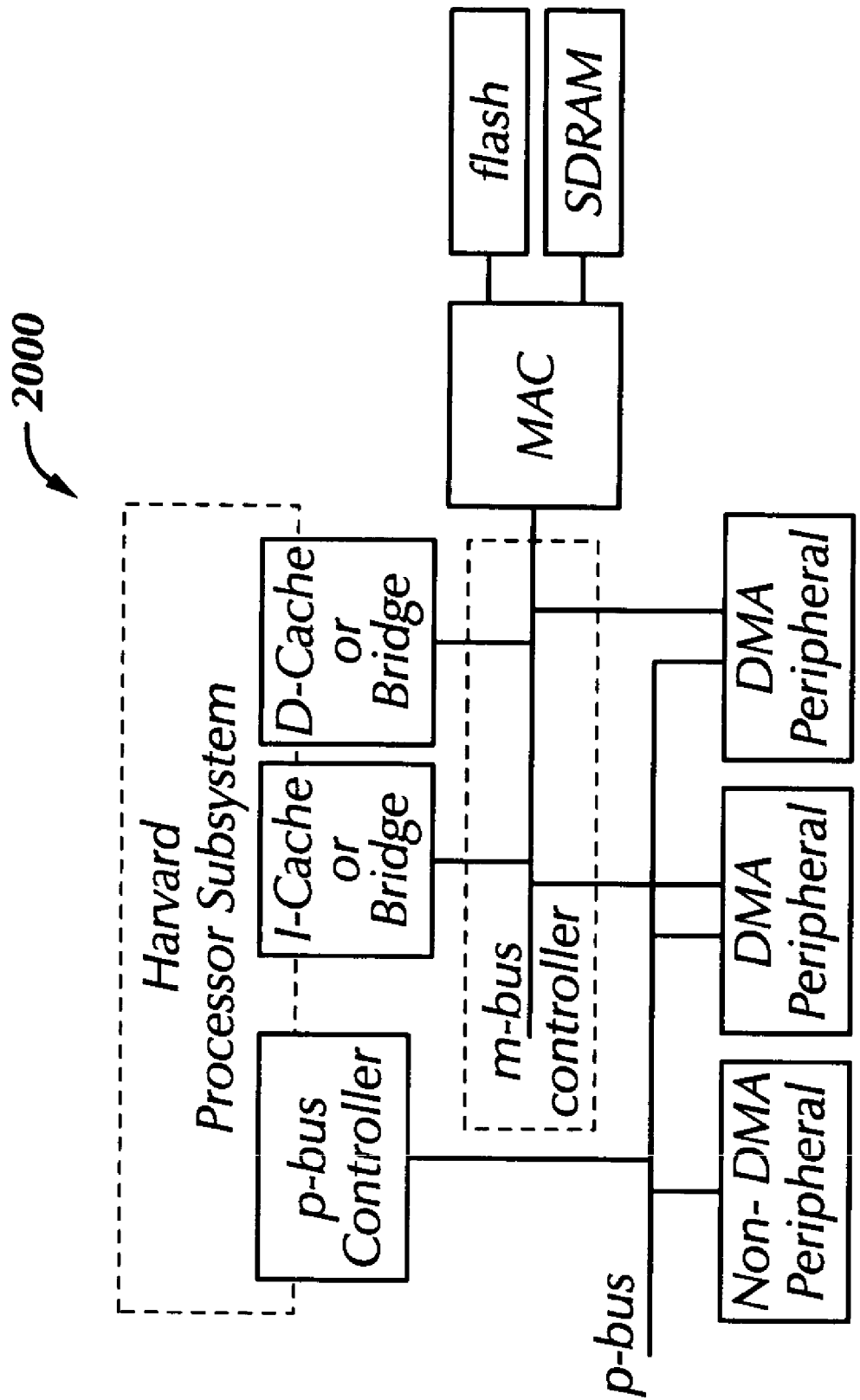
FIG. 20 is a functional block diagram of a memory controller embodiment of the present invention.
Figure 21:
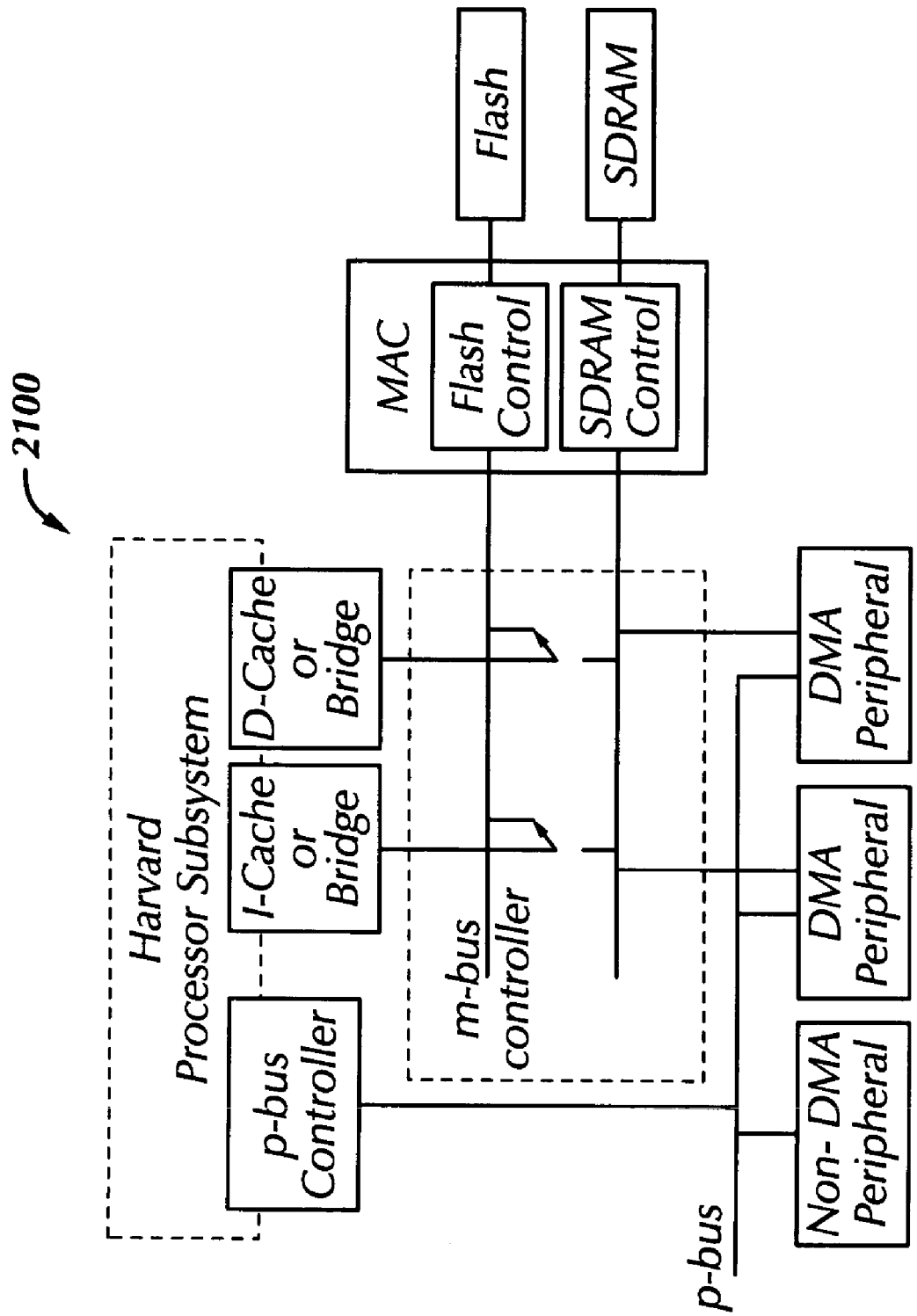
FIG. 21 is a functional block diagram of a switched channel memory controller embodiment of the present invention.
Figure 22:
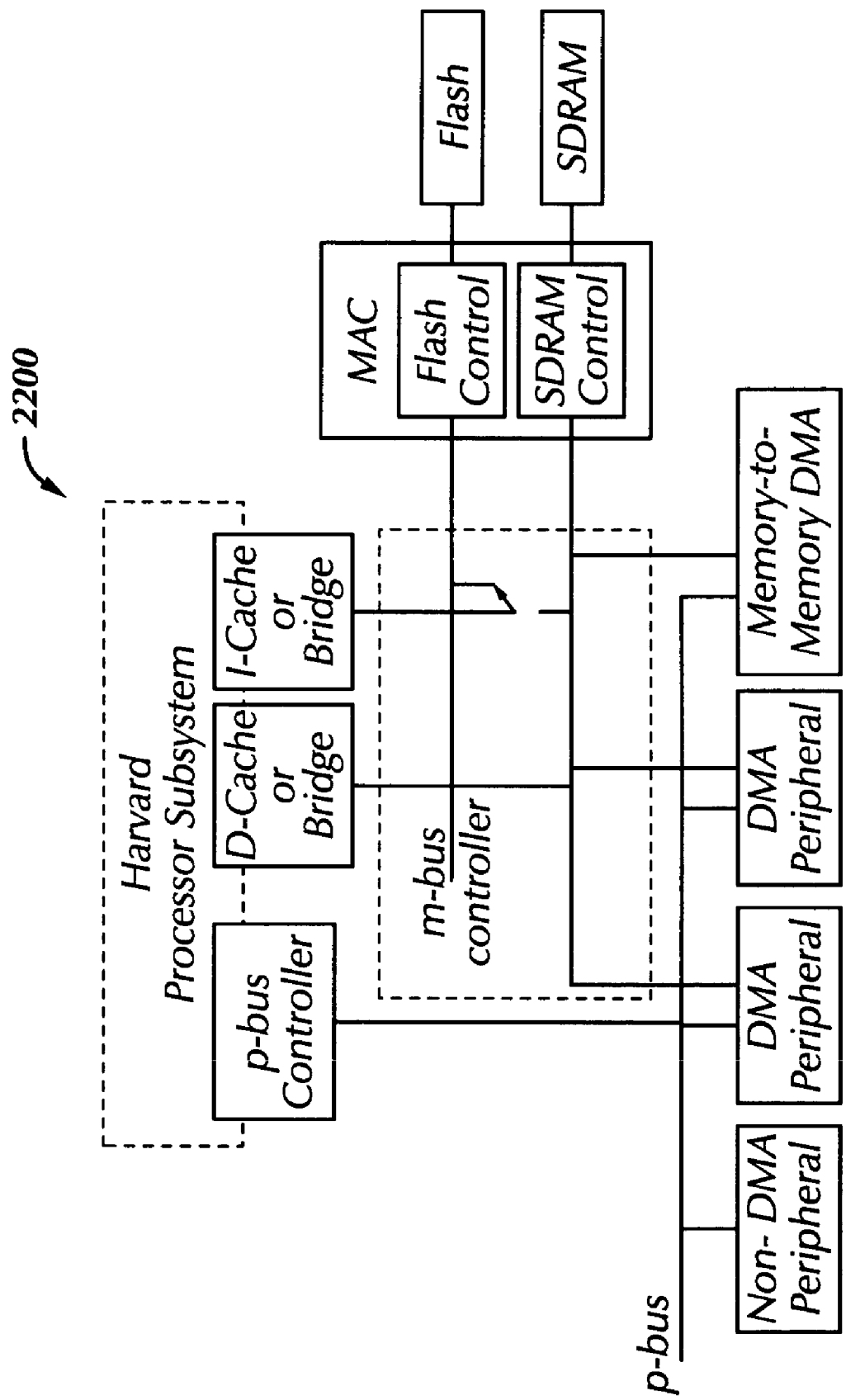
FIG. 22 is a functional block diagram of a switched channel memory controller embodiment of the present invention.

FIG. 20 represents a standard memory controller. Switched channel memory controller embodiments of the present invention, as illustrated in FIGS. 21 and 22, are possible which allow multiple DMA devices (and processors) to simultaneously communicate with multiple output channels. These output channels can be connected to external memory, internal memory, or non-DMA blocks. As with a standard memory controller, any DMA peripherals and CPUs supply a request and an address to a switched channel memory controller. However, the address includes both the port, device or memory bank address, and the requested memory location address. Once a requested port, device or bank is free, the requesting DMA or CPU is granted access and can begin transferring data. While data transfer is in progress on the requested port, another DMA peripheral or CPU can simultaneously transfer data to a different port for almost limitless bandwidth, while requiring minimal changes to the rest of the system.

A switched channel memory controller can be configured to allow particular DMAs or CPUs to access only certain channels. For example, a CPU instruction bus can be connected to an external flash memory through one channel, or an external SDRAM memory through another channel. DMA peripherals are connected to the channel with an external SDRAM. The CPU fetches instructions from the flash memory at the same time that a DMA device is accessing the external SDRAM. But if the CPU is fetching information from the SDRAM, the DMA peripheral will have to wait to communicate to the SDRAM channel.

Switched channel memory controller embodiments of the present invention operate with almost limitless bandwidth. For example, a system embodiment with a 32-bit p-bus and a 32-bit external single data rate (SDR) SDRAM running at one-hundred MHz gives eight-hundred MB/s of available bandwidth on chip. That is four-hundred MB/s available on the p-bus and four-hundred MB/s on the m-bus.

In FIG. 21, adding a separate port for 32-bit external flash memory gives 1.2 GB/s of total on chip bandwidth at one-hundred MHZ. That is four-hundred MB/s on the pbus, plus four-hundred MB/s on each of the m-bus ports. Adding a 128-bit internal dual-port RAM channel and changing from a SDR SDRAM to a double data rate (DDR) SDRAM 64-bit DIMM channel, yields four GB/s of bandwidth at one-hundred MHz. That is four-hundred MB/s on the p-bus, four-hundred MB/s on the flash memory port, plus 1.6 GB/s on each of the other m-bus ports. It is possible to select the necessary bandwidth for an application without having to resort to extremely wide bus widths or running at very high frequencies.

FIG. 22 represents a switched channel memory controller. The changes to the earlier examples that are required to implement this structure are minimal. A switched channel memory controller with two ports is implemented so that two buses of a processor can simultaneously access memory. A flash memory port is dedicated for code execution, while an SDRAM is shared among all DMA peripherals and both processor buses. The processor must arbitrate with the DMA peripherals and even its own data bus any time it is executing from shared memory with a non-switched memory controller. Shared memory arbitration is a bottleneck to maximum processor throughput.

A common strategy for eliminating such bottlenecks is to use a dedicated internal memory for code execution. For systems with very little dedicated on-chip execution RAM, using a switched channel memory controller also removes the bottleneck, at the expense of needing more chip pins.

Figure 23:
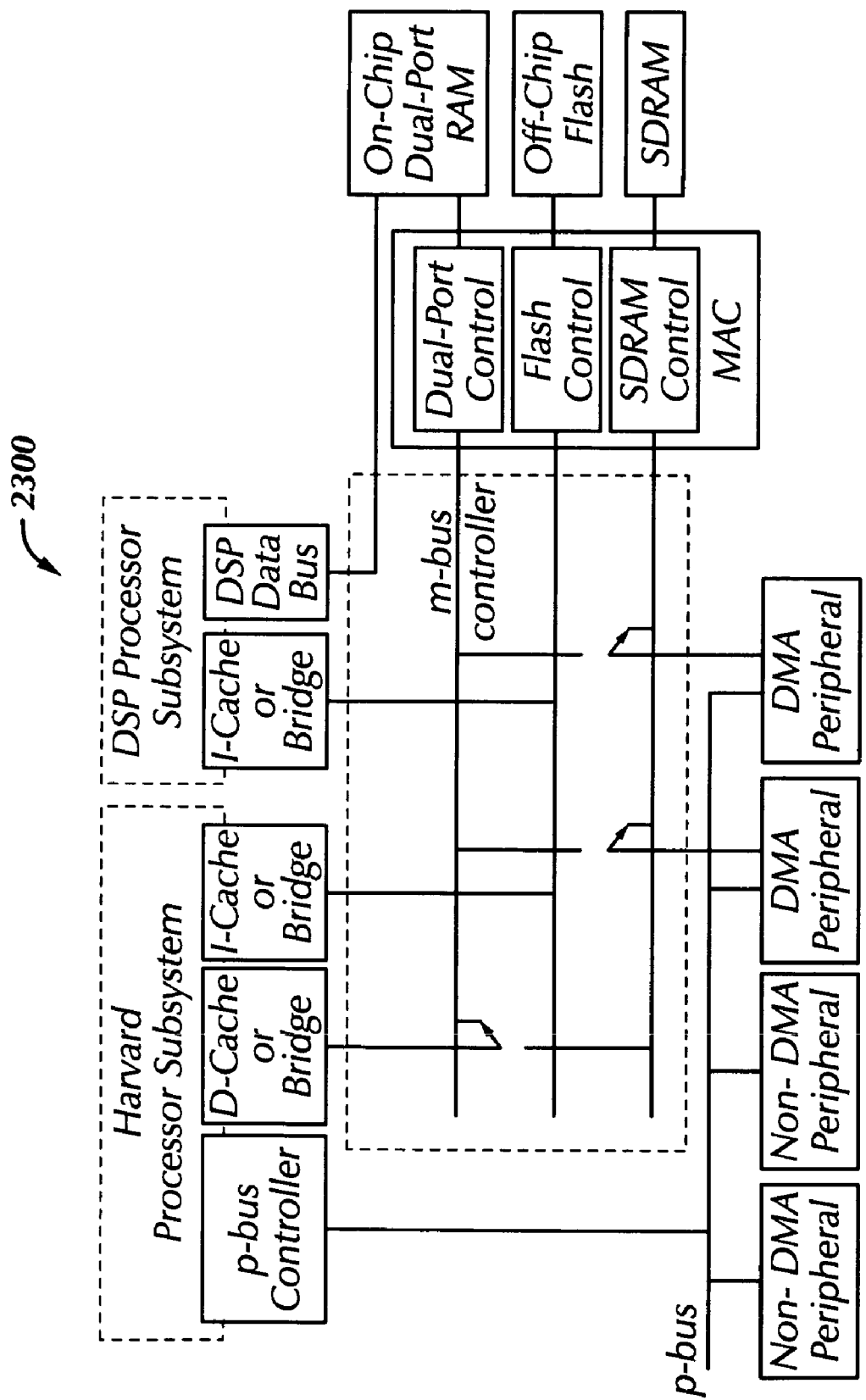
FIG. 23 is a functional block diagram of a switched channel memory controller and dual processor embodiment of the present invention.

FIG. 23 represents a switched channel memory controller with dual processors in a more complex example where the two processors each have an on-chip dual-port RAM. A switch allows execution by either processor from off-chip flash memory. Data may be transferred to or from a dual-port RAM by a DMA peripheral, or the CPU for processing by the DSP. Or data may be transferred to or from the SDFLAM for CPU processing.

With a switched channel memory controller, the CPU can execute from flash memory while simultaneously processing data from a DMA peripheral in the SDRAM. The DSP can at the same time process data from the dual-port RAM while another peripheral is transferring data to or from the RAM. With a switched channel memory controller, no changes to any blocks except the memory controller are needed for the processors and DMA peripherals to take best advantage of the available bandwidth.

Embodiments of the present invention are preferably able to run with different parts of a system running at different frequencies without having to change the CPU or peripheral interfaces. A synchronized FIFO can be interfaced to the memory controller to implement such. With the use of FIFOs, there is no need to redesign the peripheral device interface when the peripheral is moved to another system.

In a fully synchronous system, DMA channels are synchronous to the peripheral and the memory controller. However, FIFOs are needed to obtain best system performance if DMA peripherals are not operating on a same frequency as the memory controller clock signal.

A synchronizing FIFO is preferably used where a peripheral clock signal is asynchronous to the memory controller, or where the peripheral clock signal is synchronous but in a different time domain. A synchronized FIFO is preferably used where the peripheral is operating synchronous to the memory controller, but at a lower speed, e.g., half the speed. For example, if the memory access controller is operating with one-hundred MHz clock, a PCIbus DMA device operating at sixty-six MHz requires a synchronizing FIFO.

In a system poorly suited for synchronizing FIFOs, it would ordinarily be necessary to redesign the PCIbus interface to run at one-hundred MHz. But because channel interfaces are inherent to embodiments of the present invention, this is not necessary. A synchronizing FIFO would typically be necessary if the PCIbus interface were operating at one-hundred MHz, but was clock signaled by a different clock signal tree than the memory controller, and it was not possible to manage the clock signal skews between the two clock signal trees.

A synchronizing FIFO is preferably used when a peripheral clock signal is generated from a memory controller clock signal, or vice versa, and the clock signal skews are well managed. For example, if a memory access controller is running at one-hundred MHz and an Ethernet MAC clock signal is running at half the frequency of the memory controller clock signal, a synchronized FIFO would be used.

Devices with different interfaces can be mixed and matched within the embodiments of the present invention by using a channel to the m-bus (or p-bus) whose interface matches the peripheral. Channel interfaces can be adapted to resemble many peripheral interfaces. Channel interfaces can be adapted so that IP blocks do not need to be modified.

Figure 24:
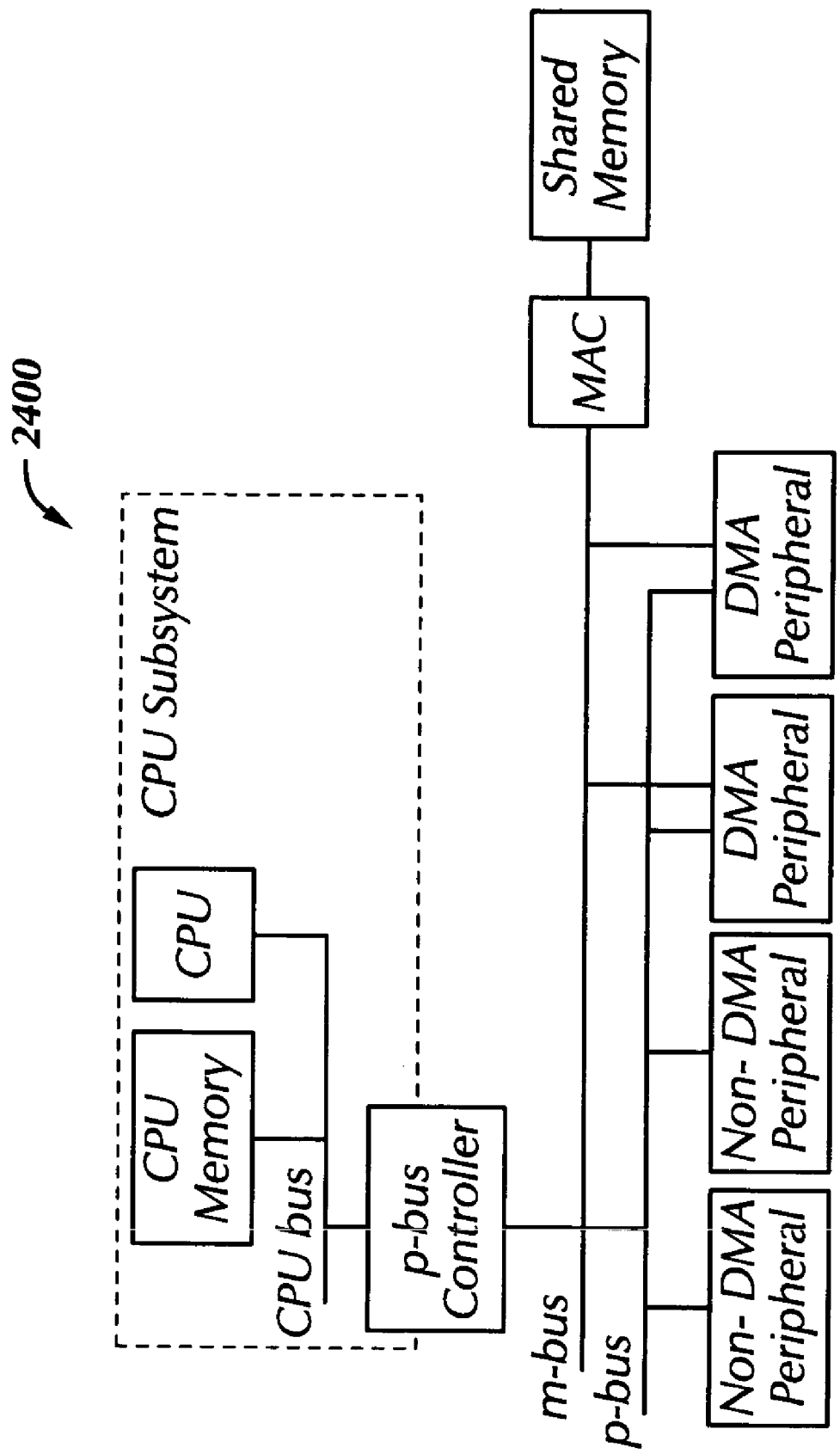
FIG. 24 is a functional block diagram of a configuration and control CPU embodiment of the present invention.

FIG. 24 represents a system without a processor interface to shared memory. Embodiments of the present invention are not limited to implementations with a CPU and shared memory. Any system with a shared resource, e.g., a PCIbus interface, can be used. Similarly, a processor is needed only if the device is programmable. If none of the peripherals are programmable, or if they are programmed through a sequencer, no processor is needed. FIG. 24 illustrates a system embodiment that uses a CPU for configuration only. Such an implementation would be suited for many consumer products.

Figure 25:
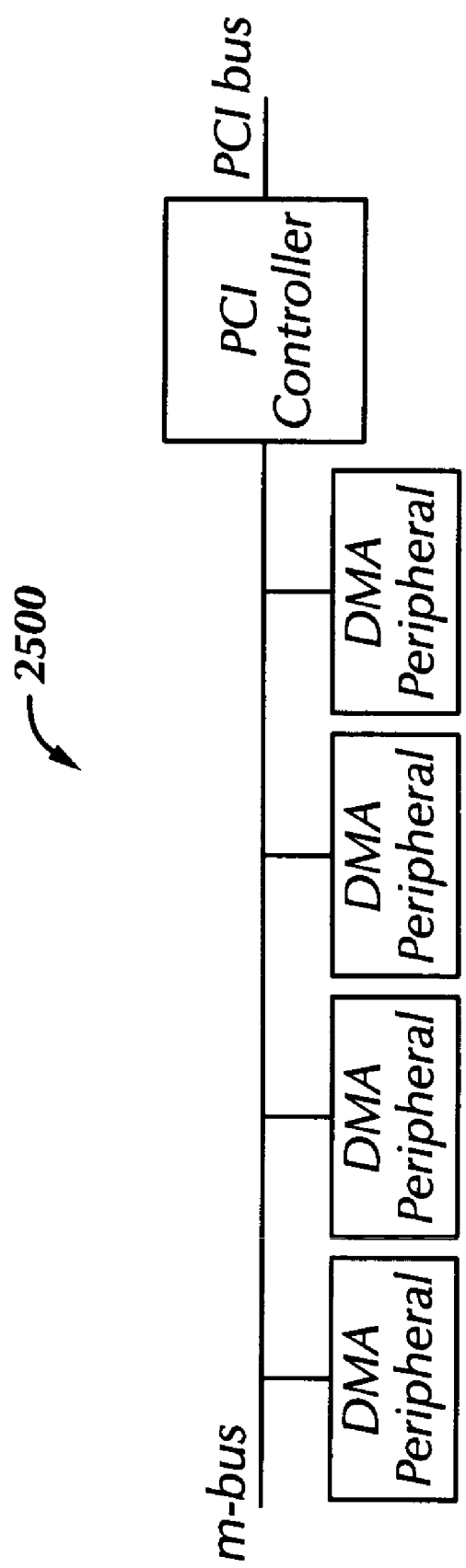
FIG. 25 is a functional block diagram of a shared PCIbus and no-processor embodiment of the present invention.

FIG. 25 illustrates a system embodiment that requires no CPU, but implements a shared controller for communication with a shared external bus. Applications include I/O cards and switching devices.

Figure 26:
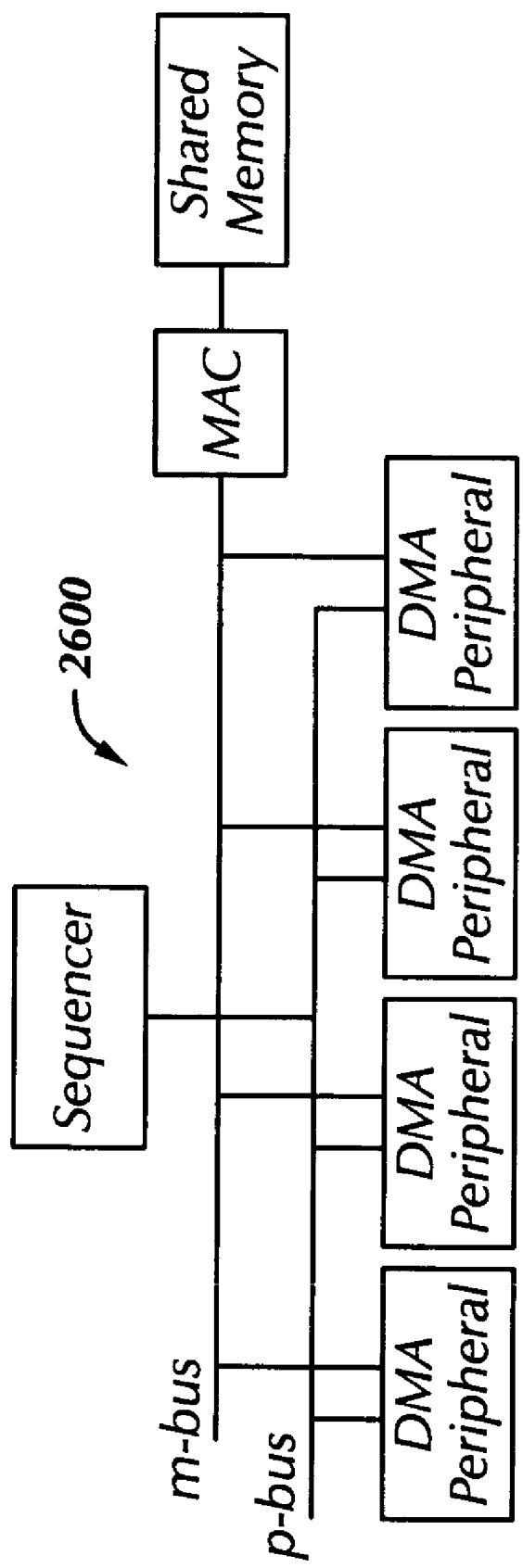
FIG. 26 is a functional block diagram of a configuration and control sequencer embodiment of the present invention.

FIG. 26 illustrates an embodiment with a sequencer for peripheral configuration and control. Such applications include switching devices or a storage controller.

In general, embodiments of the present invention differ significantly from conventional on-chip buses. Point-to-point signals and multiplexing are used instead of shared tri-stated lines to deliver higher performance while simultaneously reducing system and verification time. Typically, the architecture is characterized by two-hundred sixty-four MB/s bandwidth at sixty-six MHz, support for various width peripherals, separate peripheral I/O and DMA buses, simple protocol for reduced gate count, positive-edge clock signaling, no tri-state signals or bus holders, low-capacitive loading for high-frequency operation, support for latch based slave peripherals for low power devices, hidden arbitration for DMA bus masters, single clock signal cycle data transfers, etc.

A distinctive feature of embodiments of the present invention is the separation of I/O and memory transfers onto different buses. A p-bus provides an I/O backplane and allows a processor to configure and control peripherals. An m-bus provides a direct memory access (DMA) connection from peripherals to main memory, allowing peripherals to transfer data directly without processor intervention.

Figure 27:
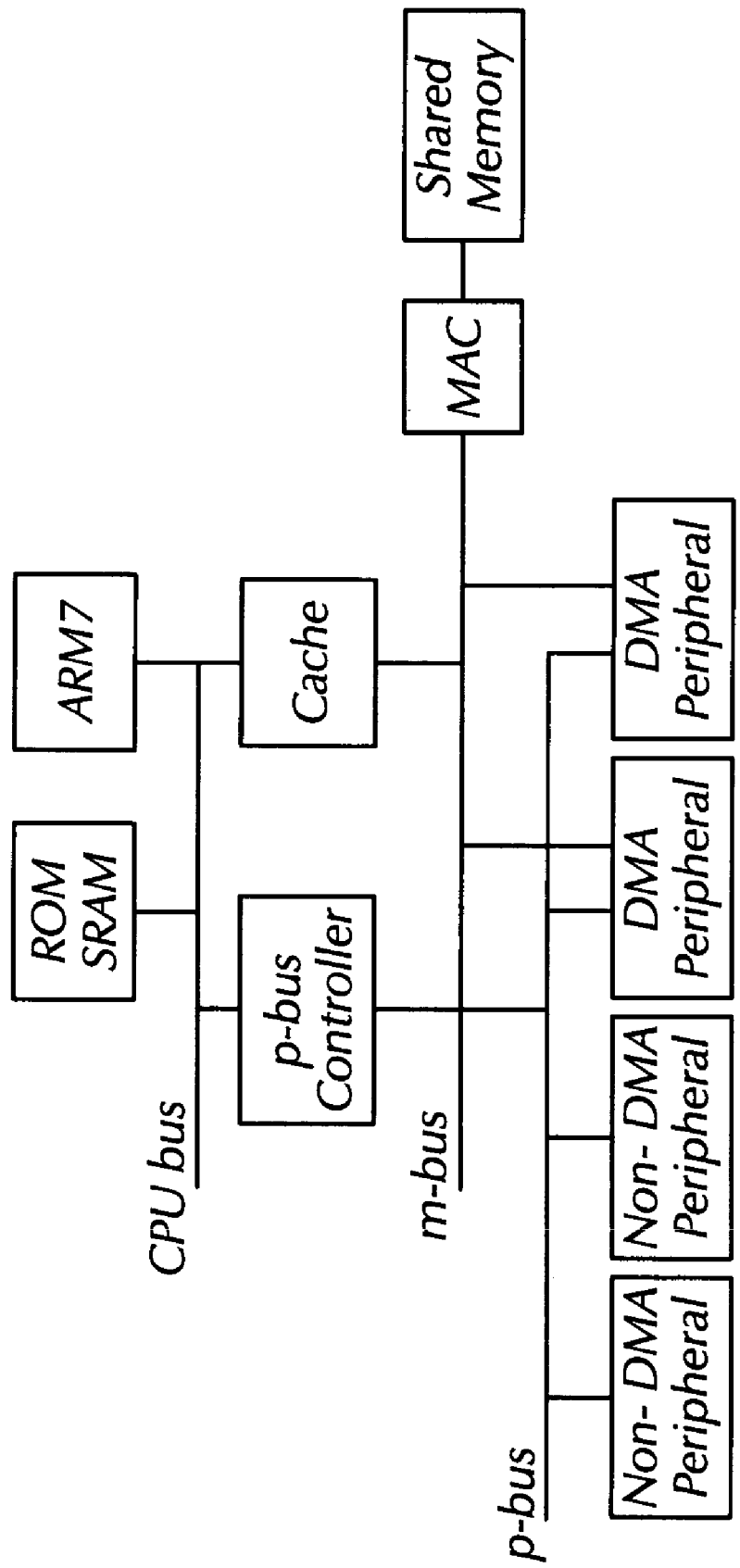
FIG. 27 is a functional block diagram of an ARM7 embodiment of the present invention.

FIG. 27 represents a bus structure for a system using the ARM7 processor core. The main embodiment functional units are a p-bus peripheral bus, an m-bus DMA bus with pipelined address, data and control, a p-bus controller which interfaces the processor local bus to p-bus, peripherals connected to the p-bus, DMA peripherals connected to the m-bus, and a memory access controller that connects the m-bus to shared memory. On-chip memory and cache blocks are preferred in most system embodiments.

The separation of I/O and memory traffic onto a p-bus and an m-bus, respectively, has several advantages over single bus systems. Signaling can be point-to-point because on a p-bus there is only one master (the p-bus controller) and multiple slaves (the peripherals), while on an m-bus there are multiple masters (the peripherals) and only a single slave (the memory access controller). In contrast, a PCIbus system must support multiple masters and slaves on a single backbone. This requires a complex protocol that adds overhead in/terms of both gates and embodiment time.

For example, a PCIbus must support split transactions largely to prevent CPU accesses to slave peripherals from blocking DMA transfers from bus mastering peripherals. In preferred embodiments, split transaction support is not needed because the slave I/O is confined to the p-bus and does not interfere with DMA transfers on the m-bus.

Figure 28:
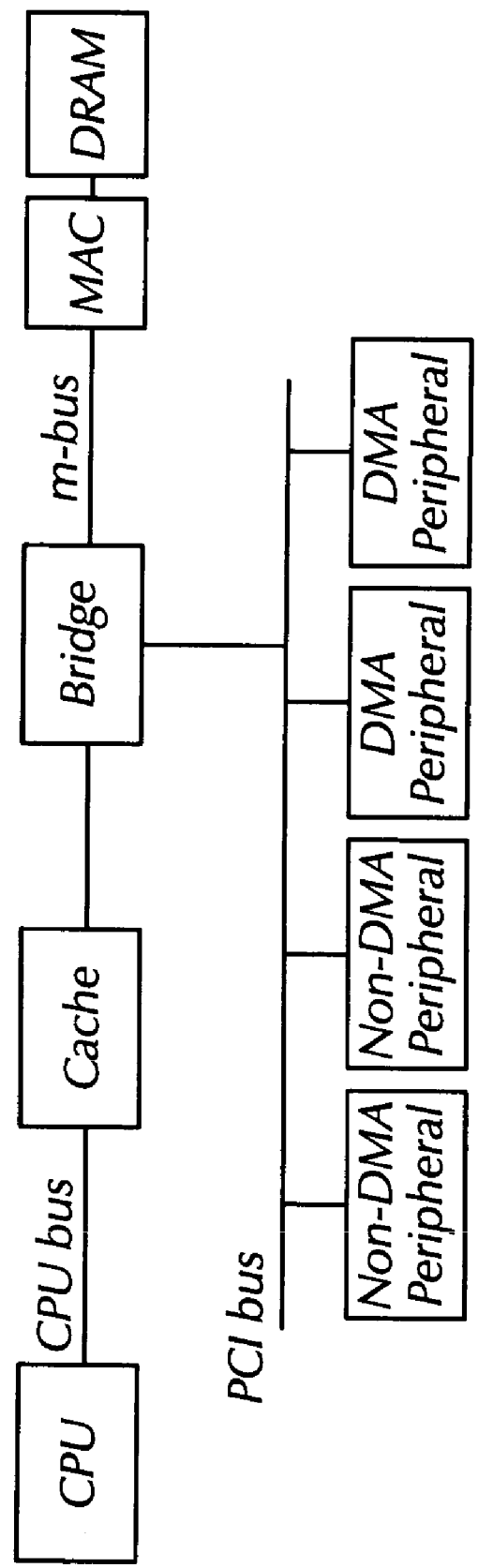
FIG. 28 is a functional block diagram of a PCIbus embodiment of the present invention.

FIG. 28 shows a PCIbus architecture. Although FIG. 27 is drawn using a conventional bus paradigm, embodiments of the present invention preferably use a star-shaped topology. The broadcast signals that are driven by the p-bus controller and MAC are connected to all their respective peripherals. The signals specific to each peripheral are point-to-point. The bus standard does not define signals from peripheral-to-peripheral that are application specific.

In practical systems, most peripherals exchange only control or status information between peripherals, and do not need to exchange data directly with their peers. Data is instead communicated through main memory using either programmed I/O or DMA. The present invention exploits this to simplify the bus architecture and avoid tri-state signals. In contrast, traditional buses such as a PCIbus are symmetrical in the sense that they may allow any master to talk directly to any slave. This complicates the bus in order to deliver a feature that is usually not used in real systems.

The exclusive use of point-to-point and broadcast signaling increases bus utilization efficiency because there is no need for turn around cycles. Load capacitances are lower because each signal has only a single driver, and only a single load for point-to-point signals. Broadcast signals can easily be re-driven by simple buffers with no extra control logic. Power consumption is reduced because conventional bus holders that oppose signal transitions are eliminated. As a result, the buses can be run at higher speed and with greater efficiency.

The p-bus provides a simple way to connect slave peripherals to the CPU. It uses a simple non-pipelined protocol and supports both synchronous and asynchronous slave peripherals. Bus clock signal frequency is application and technology specific, and can easily reach up to one-hundred MHz with 0.35-micron technology. The p-bus can support various peripheral data widths, and the number of address bits connected to each block is defined by the address space required. The p-bus controller is the only bus master and performs centralized address decoding to generate a dedicated select signal to each peripheral.

The p-bus protocol and signaling permit easy memory-mapped register control common to ASIC control. The common tasks of writing and reading registers can be accomplished with a small number of logic gates and minimal verification time. Synthesis and static timing analysis are straightforward because all signals are launched and captured by rising edges of the bus clock signal, and are not bi-directional. Peripherals can be operated at different clock signal frequencies than the p-bus controller by including a wait signal. This simplifies peripheral embodiments and integration by isolating clock signal domains. The p-bus is also designed with low power consumption in mind. Special provisions are provided to ease the integration of peripherals that, though synchronous, use latches for lower power consumption.

The m-bus connects the CPU and DMA-capable peripherals to a main memory via the MAC. The bus clock signal frequency is application and technology specific, and can reach to one-hundred MHZ using 0.35 micron technology. The m-bus uses pipelined address and data and hidden arbitration and can support various peripheral data widths. The MAC is the only slave on the bus, all cycles are initiated by the CPU or other DMA peripherals.

The m-bus protocol is optimized both for ASIC-type implementations and for data transfers to and from memory devices. Control signals that are commonly needed for DMA-type transfers are central to the protocol, eliminating the need for bus protocol state machines. The m-bus uses hidden arbitration to further simplify its protocol. However, recognizing that ASICs have a wide range of system requirements, the arbitration scheme is application specific. Because memory devices vary significantly in their protocols and access latencies, the m-bus provides to be adaptive, allowing the MAC to control the bus as it sees fit for the memory device being accessed. This allows optimizations to be made in the MAC to maximize throughput and minimize latency, or for cost-sensitive applications, to minimize embodiment size.

The time required to connect system-on-chip components together and to start system-level simulation can be significantly reduced by standardizing bus interfaces. This greatly simplifies the task of hooking the blocks together. Chip designers can specify which blocks they require and press a button to generate the top level RTL code. This saves time and prevents wiring errors that can take hours to debug in simulation.

The various embodiments of the present invention use a silicon-proven on-chip bus architecture that has significant advantages compared with other system interconnect schemes. The architecture of the present invention is optimized for ASIC implementations. Its shared-memory architecture is optimized for devices with high bandwidth data streams requiring extensive DMA. This covers a wide range of applications such as mass storage, networking, printer controllers, and mobile communications. Many embodiments are synthesis friendly and provide "plug and play" connectivity to reduce silicon embodiment time.

In sum, the present invention is a System-on-Chip apparatus and integration methodology wherein a single semiconductor integrated circuit includes one or more processor subsystems, one or more DMA-type peripherals, and a Memory Access Controller on a first internal unidirectional bus. The first internal unidirectional bus controls transactions between the processor subsystem(s) and the DMA peripheral(s) using a Memory Access Controller and unidirectional address and transaction control signals that are launched and captured on the rising edges of the bus clock signal. The first internal unidirectional bus supports pipelined memory transactions, wherein a memory access may occur before data associated with a prior memory access has been transferred. In some embodiments, the first internal unidirectional bus includes a bus arbiter that grants access to the first internal unidirectional bus and arbitrates memory accesses for transactions on the first internal unidirectional bus. In some embodiments that include a bus arbiter, arbitrations are "hidden," meaning that the memory access arbitration for a selected transaction may overlap a data transfer associated with a prior transaction, or may occur in the same clock cycle in which access is granted and data transfer begins for the selected transaction.

In some embodiments of the present invention, the first internal unidirectional bus supports reading and writing data in bursts. In some embodiments, a variable number of clock cycles may elapse between any two pipelined memory transactions.

Some embodiments of the present invention may include a second internal unidirectional bus that couples the processor subsystem(s) via an interface controller to one or more non-DMA peripherals. The second internal unidirectional bus controls transactions between the processor subsystem(s) and the non-DMA peripheral(s) using unidirectional address and transaction control signals.

In some embodiments, the DMA peripherals may operate asynchronously with the first internal unidirectional bus and/or the non-DMA peripherals may operate asynchronously with the second internal unidirectional bus, meaning that the peripherals use a clock signal in a different time domain or at a different frequency from the clock signal used by the bus(es) on which the peripheral communicates.

Although the present invention has been described in terms of the presently preferred embodiments, it is to be understood that this disclosure is not Interpreted as limiting. Various alterations and modifications will no doubt become apparent to those skilled in the art after having read the above disclosure. Accordingly, it is intended that all appended claims be interpreted as covering all alterations and modifications as falling within the true spirit and scope of the invention.

The invention claimed is:

1. A System-on-Chip (SOC) apparatus, comprising:
a single semiconductor integrated circuit that includes one or more processor subsystems, one or more DMA-type peripherals and one or more non-DMA peripherals;
a first internal unidirectional bus that couples via one or more channel controllers or caches to said one or more processor subsystems, and said DMA-type peripheral(s), said first internal unidirectional bus has a clock signal and controls transactions between said one or more processor subsystems and said DMA-type peripheral(s) using a Memory Access Controller and point to point unidirectional address and transaction control signals launched and captured on the rising edges of the clock signal, said first internal unidirectional bus supports reading and writing data in bursts and supports pipelined memory transactions, wherein a memory access may occur before data associated with a prior memory access has been transferred and said first internal unidirectional bus, said first internal unidirectional bus allows for high speed accesses to one or more shared memories between said processor subsystems and said DMA-type peripherals, said first internal unidirectional bus is optimally used for peripheral to memory and memory to peripheral communications and can facilitate peer to peer communication;
a bus arbiter coupled to said first internal unidirectional bus, wherein said arbiter grants access to said first internal unidirectional bus and arbitrates memory accesses for transactions on said first internal unidirectional bus; and
a second internal unidirectional bus that couples said one or more processor subsystems via an interface controller to said non-DMA peripherals, said Memory Access Controller, and said DMA-type peripheral(s), wherein said second internal unidirectional bus has a clock signal and controls transactions between said one or more processor subsystems, said non-DMA peripheral(s), said Memory Access Controller, and said DMA-type peripheral(s) using point to point unidirectional address and transaction control signals, wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal, said second internal unidirectional bus is the communication interface between said processor subsystems and said non-DMA peripherals and provides for low speed accesses to said non-DMA peripherals.

2. The apparatus according to claim 1 wherein said first internal unidirectional bus supports reading and writing data in bursts.

3. The apparatus according to claim 1 wherein a variable number of clock cycles elapse between any two said pipelined memory transactions.

4. The apparatus according to claim 1 wherein one or more of said DMA-type peripherals use one of the following clock signals: a clock signal having a frequency that is different from the first internal unidirectional bus clock signal, or a clock signal having a frequency that is the same as the frequency of the first internal unidirectional bus clock signal, but has a different time domain than the first internal unidirectional bus clock signal.

5. The apparatus according to claim 1 wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal.

6. A method that makes a System-on-Chip (SOC) apparatus, comprising:
providing a single semiconductor integrated circuit that includes one or more processor subsystems, one or more DMA-type peripherals, and one or more non-DMA peripherals;
coupling a first internal unidirectional bus via one or more channel controllers or caches to said one or more processor subsystems, and said DMA-type peripheral(s), said first internal unidirectional bus has a clock signal and controls transactions between said one or more processor subsystems, and said DMA-type peripheral(s) using a Memory Access Controller and point to point unidirectional address and transaction control signals launched and captured on the rising edges of the clock signal, said first internal unidirectional bus supports reading and writing data in bursts and supports pipelined memory transactions, wherein a memory access may occur before data associated with a prior memory access has been transferred and said first internal unidirectional bus, said first internal unidirectional bus is optimally for high speed accesses to one or more shared memories between said sub subsystems and said DMA-type peripherals, said first internal unidirectional bus is optimally used for peripheral to memory and memory to peripheral communications and can facilitate peer to peer communications;
coupling a bus arbiter to said first internal unidirectional bus, wherein said arbiter grants access to said first internal unidirectional bus and arbitrates memory accesses for transactions on said first internal unidirectional bus; and
providing a second internal unidirectional bus that couples said one or more processor subsystems via an interface controller to said non-DMA peripherals, said Memory Access Controller, said DMA-type peripheral(s), wherein said second internal unidirectional bus has a clock signal and controls transactions between said one or more processor subsystems, said non-DMA peripheral(s), said Memory Access Controller, said DMA-type peripheral(s) using point to point unidirectional address and transaction control signals, wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal, said second internal unidirectional bus is the communication interface between said processor subsystems and said non-DMA peripherals and provides for low speed accesses to said non-DMA peripheral.

7. The method according to claim 6 wherein said first internal unidirectional bus supports reading and writing data in bursts.

8. The method according to claim 6 wherein a variable number of clock cycles elapse between any two said pipelined memory transactions.

9. The method according to claim 6 wherein one or more of said DMA-type peripherals use one of the following clock signals: a clock signal having a frequency that is different from the first internal unidirectional bus clock signal, or a clock signal having a frequency that is the same as the frequency of the first internal unidirectional bus clock signal, but has a different time domain than the first internal unidirectional bus clock signal.

10. The method according to claim 6 wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal.

11. A method that uses a System-on-Chip (SOC) apparatus, comprising:
providing a single semiconductor integrated circuit that includes one or more processor subsystems, one or more DMA-type peripherals, and one or more non-DMA peripherals;
controlling transactions between said one or more processor subsystems and said DMA-type peripheral(s) using a first internal unidirectional bus that couples via one or more channel controllers or caches to said one or more processor subsystems, and said DMA-type peripheral(s), said first internal unidirectional bus has a clock signal and uses a Memory Access Controller and point to point unidirectional address and transaction control signals launched and captured on the rising edges of the clock signal, said first internal unidirectional bus supports reading and writing data in bursts and supports pipelined memory transactions, wherein a memory access may occur before data associated with a prior memory access has been transferred and said first internal unidirectional bus, said first internal unidirectional bus allows for high speed access to one or more shared memories between said processor subsystems and said DMA-type peripherals, said first internal unidirectional bus is optimally use for peripheral to memory and memory to peripheral communications and can facilitate peer to peer communications;
granting access to said first internal unidirectional bus and arbitrating memory accesses for transactions on said first internal unidirectional bus using a bus arbiter coupled to said first internal unidirectional bus; and
controlling transactions between said one or more processor subsystems, said non-DMA peripheral(s), said Memory Access Controller, and said DMA-type peripheral(s) using a second internal unidirectional bus that couples said one or more processor subsystems via an interface controller to said non-DMA peripherals, said Memory Access Controller, and said DMA-type peripheral(s), wherein said second internal unidirectional bus has a clock signal and uses point to point unidirectional address and transaction control signals, wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal, said second internal unidirectional bus is the communication interface between said processor subsystems and said non-DMA peripherals and provides for low speed accesses to said non-DMA peripherals.

12. The method according to claim 11 wherein said first internal unidirectional bus supports reading and writing data in bursts.

13. The method according to claim 11 wherein a variable number of clock cycles elapse between any two said pipelined memory transactions.

14. The method according to claim 11 wherein one or more of said DMA-type peripherals use one of the following clock signals: a clock signal having a frequency that is different from the first internal unidirectional bus clock signal, or a clock signal having a frequency that is the same as the frequency of the first internal unidirectional bus clock signal, but has a different time domain than the first internal unidirectional bus clock signal.

15. The method according to claim 11 wherein one or more of said non-DMA peripherals use one of the following clock signals: a clock signal having a frequency that is different from the second internal unidirectional bus clock signal, or a clock signal having a frequency that is the same as the frequency of the second internal unidirectional bus clock signal, but has a different time domain than the second internal unidirectional bus clock signal.

* * * * *